(12) United States Patent
Sweet et al.

(10) Patent No.: US 10,601,807 B2
(45) Date of Patent: *Mar. 24, 2020

(54) SYSTEMS AND METHODS FOR PROVIDING CONTAINER SECURITY

(71) Applicant: CloudPassage, Inc., San Francisco, CA (US)

(72) Inventors: Carson Sweet, San Francisco, CA (US); Amit Gupta, San Francisco, CA (US)

(73) Assignee: CloudPassage, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/011,532

(22) Filed: Jun. 18, 2018

(65) Prior Publication Data

US 2018/0309747 A1 Oct. 25, 2018

Related U.S. Application Data

(63) Continuation-in-part of application No. 15/154,730, filed on May 13, 2016, now Pat. No. 10,027,650,
(Continued)

(51) Int. Cl.
*H04L 29/06* (2006.01)
*G06F 21/55* (2013.01)
(Continued)

(52) U.S. Cl.
CPC ...... *H04L 63/0807* (2013.01); *G06F 9/45558* (2013.01); *G06F 21/55* (2013.01);
(Continued)

(58) Field of Classification Search
CPC . H04L 63/0807; H04L 63/0428; H04L 63/08; H04L 63/083; H04L 63/20;
(Continued)

(56) References Cited

U.S. PATENT DOCUMENTS 6,385,497 B1   5/2002  Ogushi et al.
6,505,248 B1   1/2003  Casper et al.
(Continued)

FOREIGN PATENT DOCUMENTS

EP   1 818 833 A1   8/2007
JP   2002-507295    3/2002
(Continued)

OTHER PUBLICATIONS

U.S. Appl. No. 61/810,480, filed Apr. 10, 2013, Kirner, P. J., et al.
(Continued)

*Primary Examiner* — Sarah Su
(74) *Attorney, Agent, or Firm* — Morgan, Lewis & Bockius LLP

(57) ABSTRACT

Computer systems and methods are provided in which an agent executive running concurrent with a security module, when initially executed, obtains an agent API key from a user. This key is communicated to a grid computer system. An agent identity token, generated by a cryptographic token generation protocol when the API key is valid, is received from the grid and stored in a secure data store associated with the agent executive. Information that evaluates the integrity of the agent executive is collected using agent self-verification factors. The information, encrypted and signed with a cryptographic signature, is communicated to the grid. Commands are obtained from the grid by the agent executive to check the security, compliance, and integrity of the computer system. Based on these check results, additional commands are obtained by the grid by the agent executive to correct security, compliance, and integrity problems and/or to prevent security comprises.

33 Claims, 13 Drawing Sheets

Related U.S. Application Data which is a continuation of application No. 14/746,334, filed on Jun. 22, 2015, now Pat. No. 9,369,493, which is a continuation of application No. 13/854,513, filed on Apr. 1, 2013, now Pat. No. 9,065,804, which is a continuation of application No. 13/205,948, filed on Aug. 9, 2011, now Pat. No. 8,412,945.

(51) Int. Cl.
*G06F 21/56* (2013.01)
*G06F 21/57* (2013.01)
*G06F 9/455* (2018.01)

(52) U.S. Cl.
CPC ............ *G06F 21/56* (2013.01); *G06F 21/577* (2013.01); *H04L 63/0428* (2013.01); *H04L 63/08* (2013.01); *H04L 63/083* (2013.01); *H04L 63/20* (2013.01); *G06F 2009/45587* (2013.01); *G06F 2221/034* (2013.01); *H04L 63/0227* (2013.01); *H04L 63/126* (2013.01); *H04L 63/166* (2013.01)

(58) Field of Classification Search
CPC . H04L 63/0227; H04L 63/126; H04L 63/166; G06F 9/45558; G06F 21/55; G06F 21/56; G06F 21/577; G06F 2009/45587; G06F 2221/034

See application file for complete search history.

(56) References Cited

U.S. PATENT DOCUMENTS

| | | |
|---|---|---|
| 6,839,850 B1 | 1/2005 | Campbell et al. |
| 7,017,185 B1 | 3/2006 | Wiley et al. |
| 7,017,186 B2 | 3/2006 | Day |
| 7,028,228 B1 | 4/2006 | Lovy et al. |
| 7,143,444 B2 | 11/2006 | Porras et al. |
| 7,316,016 B2 | 1/2008 | DiFalco |
| 7,360,099 B2 | 4/2008 | DiFalco et al. |
| 7,418,490 B1 | 8/2008 | Zhang et al. |
| 7,444,331 B1 | 10/2008 | Nachenberg |
| 7,551,976 B2 | 6/2009 | Arima et al. |
| 7,587,754 B2 | 9/2009 | DiFalco et al. |
| 7,594,270 B2 | 9/2009 | Church et al. |
| 7,596,227 B2 | 9/2009 | Illowsky |
| 7,620,715 B2 | 11/2009 | DiFalco et al. |
| 7,657,926 B1 | 2/2010 | Baker |
| 7,747,736 B2 | 6/2010 | Childress et al. |
| 7,765,460 B2 | 7/2010 | DiFalco et al. |
| 7,822,724 B2 | 10/2010 | DiFalco et al. |
| 7,975,031 B2 | 7/2011 | Bhattacharya et al. |
| 7,987,444 B2 | 7/2011 | Fuller et al. |
| 7,991,764 B2 | 8/2011 | Rathod |
| 7,991,859 B1 * | 8/2011 | Miller .................. H04L 41/0803 709/220 |
| 7,996,836 B1 | 8/2011 | McCorkendale et al. |
| 8,005,879 B2 * | 8/2011 | Bornhoevd ............... G06F 8/60 707/899 |
| 8,005,966 B2 * | 8/2011 | Pandya .................... H04L 29/06 709/228 |
| 8,140,635 B2 | 3/2012 | DiFalco |
| 8,176,158 B2 | 5/2012 | DiFalco et al. |
| 8,204,984 B1 | 6/2012 | Aziz |
| 8,214,875 B2 | 7/2012 | John |
| 8,281,396 B2 | 10/2012 | Ahmad et al. |
| 8,407,335 B1 | 3/2013 | Church et al. |
| 8,484,694 B2 | 7/2013 | Diebler et al. |
| 8,490,188 B2 | 7/2013 | Kandek et al. |
| 8,539,545 B2 | 9/2013 | Kartha et al. |
| 8,566,823 B2 | 10/2013 | Wagner et al. |
| 8,600,996 B2 | 12/2013 | Good et al. |
| 8,677,499 B2 | 3/2014 | Lim |
| 8,806,037 B1 | 8/2014 | Kalra |
| 8,806,638 B1 | 8/2014 | Mani |
| 8,819,491 B2 | 8/2014 | Whitlock et al. |
| 8,843,561 B2 | 9/2014 | Chen et al. |
| 8,850,565 B2 | 9/2014 | Patrick |
| 8,862,941 B2 | 10/2014 | Whitlock et al. |
| 8,868,987 B2 | 10/2014 | Wagner |
| 8,874,707 B1 | 10/2014 | Quilter et al. |
| 8,875,129 B2 | 10/2014 | Wagner |
| 8,914,341 B2 | 12/2014 | DiFalco |
| 8,918,883 B1 | 12/2014 | Boyle et al. |
| 8,925,093 B2 | 12/2014 | Ahmad et al. |
| 8,996,684 B2 | 3/2015 | Good et al. |
| 9,026,646 B2 | 5/2015 | Whitlock et al. |
| 9,088,615 B1 | 7/2015 | Avlasov |
| 9,124,636 B1 | 9/2015 | Rathor |
| 9,275,222 B2 | 3/2016 | Yang |
| 10,044,730 B1 | 8/2018 | Balazs |
| 10,367,834 B2 * | 7/2019 | Sweet ................ H04L 63/1416 |
| 2002/0052715 A1 | 5/2002 | Maki |
| 2002/0065878 A1 | 5/2002 | Paxhia |
| 2002/0194496 A1 | 12/2002 | Griffin |
| 2003/0018792 A1 | 1/2003 | Shiouchi |
| 2003/0115484 A1 | 6/2003 | Moriconi et al. |
| 2004/0039798 A1 | 2/2004 | Hotz et al. |
| 2004/0039803 A1 | 2/2004 | Law |
| 2004/0221174 A1 | 11/2004 | Le Saint |
| 2004/0230797 A1 | 11/2004 | Ofek et al. |
| 2004/0260733 A1 | 12/2004 | Adelstein et al. |
| 2005/0050345 A1 | 3/2005 | Dowdy |
| 2005/0102529 A1 | 5/2005 | Buddhikot |
| 2005/0182966 A1 | 8/2005 | Pham |
| 2005/0246547 A1 | 11/2005 | Oswald et al. |
| 2006/0010289 A1 | 1/2006 | Takeuchi |
| 2006/0150157 A1 | 7/2006 | Fellenstein et al. |
| 2006/0242277 A1 | 10/2006 | Torrence et al. |
| 2006/0262786 A1 | 11/2006 | Shimizu |
| 2007/0005511 A1 | 1/2007 | Martinez |
| 2007/0005961 A1 | 1/2007 | Hamblin |
| 2007/0043786 A1 | 2/2007 | DiFalco et al. |
| 2007/0124255 A1 | 5/2007 | DiFalco et al. |
| 2007/0156670 A1 | 7/2007 | Lim |
| 2007/0208918 A1 | 9/2007 | Harbin et al. |
| 2007/0214224 A1 | 9/2007 | Nam et al. |
| 2007/0282986 A1 | 12/2007 | Childress et al. |
| 2008/0060080 A1 | 3/2008 | Lim |
| 2008/0083031 A1 | 4/2008 | Meijer et al. |
| 2008/0098478 A1 | 4/2008 | Vaidya |
| 2008/0109396 A1 | 5/2008 | Kacin |
| 2008/0141372 A1 | 6/2008 | Massey |
| 2008/0195755 A1 | 8/2008 | Lu et al. |
| 2008/0244747 A1 | 10/2008 | Gleichauf |
| 2008/0262990 A1 | 10/2008 | Kapoor |
| 2008/0276309 A1 | 11/2008 | Edelman |
| 2008/0282336 A1 | 11/2008 | Diaz et al. |
| 2008/0294920 A1 | 11/2008 | Hatasaki et al. |
| 2009/0044250 A1 | 2/2009 | Krahn et al. |
| 2009/0064312 A1 | 3/2009 | Furuichi |
| 2009/0132703 A1 * | 5/2009 | Fellenstein ........... G06F 9/5072 709/224 |
| 2009/0178103 A1 | 7/2009 | Graham |
| 2009/0210520 A1 | 8/2009 | Maeno |
| 2009/0217346 A1 | 8/2009 | Manring et al. |
| 2009/0220080 A1 | 9/2009 | Herne |
| 2009/0293056 A1 | 11/2009 | Ferris et al. |
| 2009/0300607 A1 | 12/2009 | Ferries et al. |
| 2009/0300719 A1 | 12/2009 | Ferries et al. |
| 2009/0307744 A1 | 12/2009 | Nanda et al. |
| 2009/0328206 A1 | 12/2009 | Bard Sley et al. |
| 2010/0064009 A1 | 3/2010 | Chen et al. |
| 2010/0211782 A1 | 8/2010 | Auradkar et al. |
| 2010/0251340 A1 | 9/2010 | Martin |
| 2010/0255825 A1 * | 10/2010 | Bontempi ......... H04L 29/12594 455/414.1 |
| 2010/0333165 A1 | 12/2010 | Basak et al. |
| 2011/0078309 A1 | 3/2011 | Bloch et al. |
| 2011/0131413 A1 | 6/2011 | Moon |
| 2011/0138038 A1 | 6/2011 | Good et al. |
| 2011/0239120 A1 | 9/2011 | Krishnakumar et al. |
| 2011/0258452 A1 | 10/2011 | Coulier et al. |

(56) References Cited

U.S. PATENT DOCUMENTS

| | | | |
|---|---|---|---|
| 2011/0296005 A1 | 12/2011 | Labovitz et al. | |
| 2012/0023076 A1 | 1/2012 | Torrence et al. | |
| 2012/0023546 A1 | 1/2012 | Kartha et al. | |
| 2012/0089829 A1 | 4/2012 | Kholidy | |
| 2012/0110329 A1 | 5/2012 | Brown | |
| 2012/0131164 A1 | 5/2012 | Bryan et al. | |
| 2012/0131635 A1 | 5/2012 | Huapaya | |
| 2012/0158725 A1 | 6/2012 | Molloy et al. | |
| 2012/0159178 A1 | 6/2012 | Lin et al. | |
| 2012/0179805 A1 | 7/2012 | DiFalco | |
| 2012/0210425 A1 | 8/2012 | Porras et al. | |
| 2012/0210434 A1 | 8/2012 | Curtis et al. | |
| 2012/0216242 A1 | 8/2012 | Uner | |
| 2012/0217301 A1 | 8/2012 | Namey | |
| 2012/0222112 A1 | 8/2012 | DiFalco et al. | |
| 2012/0254957 A1* | 10/2012 | Fork | G06F 21/33 726/6 |
| 2012/0260082 A1 | 10/2012 | Bobzin | |
| 2012/0324225 A1* | 12/2012 | Chambers | H04L 9/0891 713/169 |
| 2013/0024364 A1* | 1/2013 | Shrivastava | G06Q 20/38 705/39 |
| 2013/0052963 A1 | 2/2013 | Briden | |
| 2013/0054454 A1* | 2/2013 | Purves | H04L 67/306 705/41 |
| 2013/0054601 A1 | 2/2013 | Whitlock et al. | |
| 2013/0073704 A1 | 3/2013 | Whitlock et al. | |
| 2013/0073715 A1 | 3/2013 | Whitlock et al. | |
| 2013/0081102 A1 | 3/2013 | Beauvais et al. | |
| 2014/0053145 A1 | 2/2014 | Steigleder | |
| 2014/0053226 A1 | 2/2014 | Fadida et al. | |
| 2014/0082366 A1 | 3/2014 | Engler | |
| 2014/0082620 A1 | 3/2014 | Wagner et al. | |
| 2014/0096181 A1 | 4/2014 | Rivers | |
| 2014/0109169 A1 | 4/2014 | Kandek et al. | |
| 2014/0137228 A1 | 5/2014 | Shema et al. | |
| 2014/0268245 A1 | 9/2014 | Kawach et al. | |
| 2014/0280305 A1 | 9/2014 | James | |
| 2014/0280535 A1 | 9/2014 | Owens | |
| 2014/0282519 A1 | 9/2014 | Apte et al. | |
| 2014/0282817 A1 | 9/2014 | Singer et al. | |
| 2014/0282818 A1 | 9/2014 | Singer et al. | |
| 2014/0310408 A1 | 10/2014 | Kirner et al. | |
| 2014/0310415 A1 | 10/2014 | Kirner et al. | |
| 2014/0373091 A1 | 12/2014 | Kirner et al. | |
| 2015/0026767 A1* | 1/2015 | Sweet | G06F 21/55 726/1 |
| 2015/0058619 A1* | 2/2015 | Sweet | G06F 21/55 713/155 |
| 2015/0127832 A1 | 5/2015 | Kirner et al. | |
| 2015/0128211 A1 | 5/2015 | Scott et al. | |
| 2015/0128212 A1 | 5/2015 | Kirner et al. | |
| 2015/0188789 A1 | 7/2015 | Jayaprakash | |
| 2015/0310217 A1 | 10/2015 | Artes | |
| 2017/0230183 A1 | 8/2017 | Sweet | |
| 2017/0344289 A1* | 11/2017 | Jeong | G06F 3/0619 |

FOREIGN PATENT DOCUMENTS

| | | |
|---|---|---|
| JP | 2011-243112 | 12/2011 |
| JP | 2012-043445 | 3/2012 |
| KR | 10-2014009932 | 8/2014 |
| TW | 200839632 | 10/2008 |
| TW | 201310944 | 3/2013 |
| WO | WO 98/54644 A1 | 12/1998 |
| WO | WO 2004/027551 A2 | 4/2004 |
| WO | WO 2004/027619 A1 | 4/2004 |
| WO | WO 2004/012104 A1 | 5/2004 |
| WO | WO 2004/059427 A2 | 7/2004 |
| WO | WO 2004/059428 A2 | 7/2004 |
| WO | WO 2006/071985 A2 | 7/2006 |
| WO | WO 2006/105422 A2 | 10/2006 |
| WO | WO 2006/105443 A2 | 10/2006 |
| WO | WO 2007/005437 A2 | 1/2007 |
| WO | WO 2007/005440 A2 | 1/2007 |
| WO | WO 2007/021823 A2 | 2/2007 |
| WO | WO 2007/022363 A2 | 2/2007 |
| WO | WO 2007/022364 A2 | 2/2007 |
| WO | WO 2007/062423 A2 | 5/2007 |
| WO | WO 2011/116459 A1 | 9/2011 |
| WO | WO 2014/141264 A1 | 9/2014 |
| WO | WO 2014/141283 A1 | 9/2014 |
| WO | WO 2014/169054 A1 | 10/2014 |
| WO | WO 2014/169062 A1 | 10/2014 |
| WO | WO 2015/026476 A3 | 2/2015 |
| WO | WO 2015/066208 A1 | 5/2015 |
| WO | WO 2015/066369 A1 | 5/2015 |
| WO | WO 2015/066648 A1 | 5/2015 |

OTHER PUBLICATIONS

U.S. Appl. No. 61/899,468, filed Nov. 4, 2013, Kirner, P. J., et al.

Almgren, et al. "A Lightweight Tool for Detecting Web Server Attacks", pp. 1-14, Global Security Analysis Laboratory, IBM Research, Zurich Research Laboratory, Rueschlikon, Switzerland, 2000.

Daniels, et al. "A Network Audit System for Host-based Intrusion Detection (NASHID) in Linux", pp. 1-10, Purdue University, CERIAS Technical Report 99/10.

Dell KACE K1000 Series, Management Appliance, 2010, pp. 1-15.

"Dome9 Releases New Android App for Secure Enterprise Access to Cloud Servers", Virtual-Strategy Magazine, http://www.virtual-strategy.com/2015/03/19/Dome9-Releases-New-Android-App-for-Secure-Enterprise-Access-to-Cloud-Servers, Mar. 19, 2015, pp. 1-2.

Foster, Ian, et al., "Cloud Computing and Grid Computing 360-Degree Compared", Deparment of Computer Science, University of Chicago, IL, USA, pp. 1-10.

Hutchins, E. M., et al. "Intelligence-Driven Computer Network Defense Informed by Analysis of Adversary Campaigns and Intrusion Kill Chains", 6th Annual International Conference on Information Warfare and Security, Washington, D.C. (2011), 14 pages.

Kaufman L.M., "Data Security in the World of Cloud Computing", Copublished by: The IEEE Computer and Reliability Societies, Jul./Aug. 2009, pp. 61-64.

Myerson, J., "Cloud computing versus grid computing: Service types, similarities and differences, and things to consider", Mar. 3, 2009, IBM Corporation 2009, 8 pages.

Porras, et al. "EMERALD: Event Monitoring Enabling Responses to Anomalous Live Disturbances", pp. 1-13, Computer Science Laboratory, 20th NISSC, Oct. 9, 1997.

Rolim, Carlos oberdan, et al., "A Cloud Computing Solution for Patient's Data Collection in Health Care Institutions", Network and Management Laboratory—LRG, pp. 1-5.

J.D. Meier, et al., "Improving Web Application Security: Threats and Countermeasures" Microsoft Corporation—patterns & practices—https://msdn.microsoft.com/en-us/library/ff647642.aspx, pp. 1-7, published Jun. 2007.

An Overview of Vulnerability Scanners, Feb. 2008, pp. 1-16.

DK Matai, mi2g, "Who's Going to Secure the Cloud?", http://www.businessinsider.com/whos-going -to-secure-the-cloud-2010-7, pp. 1-5, Jul. 20, 2010.

Kevin Fogarty, "There is no security standard for cloud; move forward anyway", http://www.itworld.com/article/2748285/virtualization/there-is-no-security-standard-for-cloud--move-forward-anyway.html, pp. 1-4, Mar. 11, 2011.

Hoff, "Incomplete Thought: Why Security Doesn't Scale . . . Yet.", http://www.rationalsurvivability.com/blog/2011/01/incomplete-though-why-secutity-doesnt'scale-yet/, pp. 1-9, Jan. 11, 2011.

Neil MacDonald, "Five Myths and Realities of Virtualization Security", http://blogs.gartner.com/neil_macdonald/2012/09/06/five/myths-and-realities-of-virtualization-security/, pp. 1-6, Sep. 6, 2012.

Bob Violino, "Five cloud security trends experts see for 2011", http://www.infoworld.com/article/2624725/data-security/five-cloud-security-trends-experts-see-for-2011.html, pp. 1-4, Dec. 29, 2010.

* cited by examiner

SYSTEMS AND METHODS FOR PROVIDING CONTAINER SECURITY

CROSS REFERENCE TO RELATED APPLICATIONS

This application is a continuation-in-part of U.S. application Ser. No. 15/154,730 filed May 13, 2016, which is a continuation of U.S. Pat. No. 9,369,493, entitled "Systems and Methods for Implementing Security," which is a continuation of U.S. Pat. No. 9,065,804 entitled "Systems and Methods for Implementing Security in a Cloud Computing Environment," which is a continuation of U.S. Pat. No. 8,412,945 entitled "Systems and Methods for Implementing Security in a Cloud Computing Environment," each of which is hereby incorporated by reference in its entirety.

TECHNICAL FIELD

The present disclosure relates generally to systems and methods for providing container security.

BACKGROUND

The tremendous scalability, flexibility, and speed of Infrastructure-as-a-Service (IaaS) makes it one of the fastest-growing sectors of the cloud computing markets. IaaS providers combine virtualization and containerization technologies with substantial infrastructure to deliver bandwidth, storage, and processing power on-demand and with granular control over scale and costs. The benefits of hosting applications and workloads on cloud servers are enormous, making cloud servers the de facto norm for a rapidly growing set of use cases.

Security and compliance, however, remain major challenges to adoption of public cloud infrastructure services. Usage agreements and documentation squarely make the user of IaaS, not the provider, responsible for protecting servers, applications and data in the cloud—essentially everything from the virtual machine operating system upward, or from the container upward, in the stack.

One challenge to IaaS is that cloud servers attract e-criminals. Online fraud has grown into a sophisticated underground economy that requires infrastructure on a massive scale. Such online fraud comes in many forms, such as phishing, password cracking, and denial of service attacks, and often make use of botnets. Botnets are illicit networks built from compromised servers and personal computers. Some botnets consist of thousands of "zombies," personal computers infected by malware, which carry out commands on behalf of the botnet operators. These compromised computers can bombard web servers with denial-of-service attacks, fire thousands of password attempts per hour, and participate in numerous other online cracking activities.

Some fraudsters and e-criminals use command-and-control software to coordinate zombie attack execution. Command-and-control software frequently operates from compromised servers, without the server owner's knowledge. Fraudsters demand a constant stream of freshly compromised servers to keep botnets running. An entire underground business known as bot herding has emerged to capitalize on this illicit need.

Bot-herders make their living by building botnets to then sell or rent to other e-criminals. This practice has evolved to the point of Fraud-as-a-Service, the sale of prebuilt botnets on demand, for a few hundred dollars a month. It takes bot herders time and resources to seek out and compromise vulnerable servers. Economies of scale and cost-benefit apply to a bot herding business just as any other. Compromising an elastic cloud infrastructure environment can return a windfall versus hacking into a traditional hardware server. If a bot-herder is able to place command-and-control software on a virtual machine, or a container, that later is duplicated through cloning or cloud bursting, the botnet capacity will automatically grow. For stakeholders in cloud hosting environments, the implication is a higher expectation of being targeted for server takeovers, root-kitting and botnet command-and-control insertions.

An additional security concern for IaaS is that servers have more exposure in the cloud. More specifically, servers hosted in public IaaS environments have more exposure to compromise than servers do within the traditional data center, where layers of perimeter controls defend server weaknesses from exploit. Cloud IaaS environments often do not offer the control over network topology required to implement perimeter security strategies. As a result, vulnerabilities on each cloud server are more exposed to compromise than those in a traditional data center.

In a typical private data center environment, security chokepoints and/or network demarcation zones (DMZs) exist. Firewalls, intrusion detection systems (IDS) and unified threat management devices easily inspect external traffic from sources such as Internet connectivity. Typically, hardware acceleration within the data center boosts performance and compensates for the processing demands required to inspect and control all network traffic in and out of an organization. Because public IaaS environments rarely offer control over hardware or topology, these control mechanisms are unavailable to enterprises hosting servers there.

Traditional perimeter security depends heavily on control over network factors like IP addressing, physical topology and routing. Customers of cloud IaaS have far less of this control; the cloud provider usually dictates network addressing and routing. Server IP addresses are unpredictable, creating serious complications in configuring security mechanisms. Public IaaS environments also typically segment network traffic at the virtual machine level, or the container level, meaning the only traffic a server can see is its own. It is not possible to use network-level intrusion detection systems, intrusion prevention systems or wire-level unified threat management mechanisms in this environment. The performance implications of each cloud server performing traffic inspection at the wire level are staggering, especially given the lack of hardware control. Additionally, the wire-level access to network traffic required of network intrusion detection systems is rarely, if ever, afforded to customers of cloud servers. In multi-tenant cloud environments, such access is impossible since multiple customers share the same network, and allowing access to operate a network IDS would expose multiple customers' network traffic to capture.

Even in a traditional data center with perimeter defenses in place, server-level security such as hardening, secure application configuration, and patch management are important. In the cloud, where front-line defenses are extremely limited, server-level security protection is important. Cloud servers are largely on their own to protect themselves. Strong and highly automated host-based controls that implement all needed capabilities at the host level are important.

An additional security concern for IaaS is that cloud elasticity multiplies attack surfaces. Elasticity is a key differentiator distinguishing IaaS from other infrastructure hosting models. Servers are no longer boxes mounted to racks bolted to the floor. With virtualization, containerization, and cloud technologies, servers are now files and metadata that can be instantly copied, migrated, and stored offline for later reactivation. Uncontrolled copies of virtual servers and their content can be maliciously or accidentally created nearly instantly. Such copies can easily be reactivated in environments also uncontrolled by the server owner. Therefore, only security that is implemented within (and therefore is copied and moves with) a virtual computer, or a container, is able to protect that virtual computer, or container, without regard for its operating location.

Cloud elasticity provides companies with the ability to cloudburst, expanding the number of servers and available computer power within minutes. However, this significantly increases the risk of compromise. The problem is quite simply that, as a virtual server duplicates, so do its vulnerabilities and exposures. Given the speed with which servers can multiply, this issue can increase the attackable surface area of a cloud server farm dramatically within minutes.

Inactive machine images, container images, or snapshots are virtual machines, or containers, that are saved for later reactivation or as a template, or layer, for new servers. While this capability is clearly useful, offline server images, being inactive, do not get updates regarding newly discovered vulnerabilities, policy changes, or modification to user accounts and access rights. When a hibernated server is reactivated, there will be access privileges, software vulnerabilities, and outdated configurations that expose it to immediate compromise.

When adopting a cloud-hosting model, system administrators and other stakeholders should be aware of and account for these issues. One incorrectly configured server, either created recently or resurrected from storage, could multiply during cloning and cloud-bursting operations to become the "typhoid Mary" of the cloud farm.

Another challenge to IaaS arises during development of application code in cloud hosting environments. Many organizations, like small businesses and autonomously-operating business units, turn to cloud hosting for application development. Public cloud hosting reduces barriers to application development, increasing speed to market for technology related products. Special infrastructure skills, network configuration and hardware setup time are minimal. This is an attractive proposition, especially for business and technology managers frustrated with real or perceived delays and "red tape" associated with infrastructure setup. Sometimes central information technology organizations sanction cloud-based development efforts; in some instances, individual business units' charge ahead independently. At some point, all successful development projects go into production. Sometimes the application continues to run in the public cloud environment. Often the application code comes back in-house with the cloud server in a ready-to-run virtual machine image or a ready-to-run container image.

If cloud servers used for development are not secured properly, undesired results may occur. These servers are highly exposed, and often the dynamic nature of application development masks signs of intrusion. Compromise impact could include code theft or insertion of malicious functionality into the new application. Any live data used for development purposes, a poor but disturbingly frequent practice, could be at risk and compromised with the server. If rootkits or other malware are dropped onto the cloud server, that malware could come back to the enterprise data center, making a cloud server into a powerful and dangerous Trojan horse.

As the above background details, clearly there is a new set of exposures and risks associated with hosting applications, data and workloads in public IaaS environments. Existing technologies that secure computers are not adequate at addressing such exposures. For instance, hardware based security devices cannot be used by a virtual machine or a container, because virtual machine and container owners often have no ability to deploy hardware. In many public cloud infrastructure hosting environments, the owner of the virtual machine or container typically has none or limited control over hardware. Server security strategies that depend on creating network perimeter controls are also inadequate because virtual machine or container owners do not have enough control over the networking environment to implement perimeters. Server security strategies that focus on putting security controls at the host level (host-based security) are also ineffective because existing host-based security technologies almost exclusively perform computation on the computer being protected, which consumes large amounts of computing, storage and other resources on each individual computer. Placing multiple host-based security technologies on a single virtual machine, or container, would cause untenable levels of resource consumption on that computer, rendering it unsatisfactory at performing its actual computing function.

The issues above make it clear that improvements in server security management are needed. Specifically, what is needed in the art is the creation of an elastic security management capability for containers and virtual machines that does not impact the performance of the container or virtual machine being protected and is able to implement security controls that move with the container or virtual machine. Conventional perimeter-oriented methods of protection that have worked for years are highly problematic or completely untenable in these environments. The dynamic nature of public and hybrid cloud server farms further complicates matters. The lack of options to protect servers in high-risk public clouds can impede companies from embracing public IaaS and thereby realizing the benefits of IaaS. Thus, there is a need in the art for security measures that secure IaaS servers in an automated, portable, and elastic manner.

The information disclosed in this Background of the Invention section is only for enhancement of understanding of the general background of the invention and should not be taken as an acknowledgement or any form of suggestion that this information forms the prior art already known to a person skilled in the art.

SUMMARY

Advantageously, the systems and methods for providing container security detailed in the present disclosure address the shortcomings discussed above.

Accordingly, various aspects of the present disclosure are directed to providing systems and methods for providing container security.

One aspect of the present disclosure provides a security system. The security system comprises a first server computer system. The first server computer system comprises one or more processing units and a memory. The memory is coupled to at least one of the one or more processing units. A security module and an agent executive are stored in the memory. The agent executive is executed by at least one of the one or more processing units, and is configured to run concurrently with the security module. The agent executive includes instructions for obtaining an agent application programming interface (API) key. In some embodiments, the agent executive obtains the API key from a user. In alternative embodiments, instead of obtaining the agent API key from the user, the agent API key is obtained by an automated process. In some instances, this automated process occurs when the agent executive is executed for a first time.

Once the agent executive obtains the API key, it is communicated to a remote grid computer system.

Responsive to this, an agent identity token is received from the remote grid computer system. The remote grid computer system generates the agent identity token through a cryptographic token generation protocol using the API key. This occurs when the API key is deemed valid by the remote grid computer system.

Instructions are further stored in the agent executive for storing the agent identity token in a secure data store. This secure data store is associated with the agent executive.

Information is collected on the first server computer system for an evaluation of integrity of the agent executive. This evaluation of integrity uses a variety of agent self-verification factors. The collected information is encrypted, which in turn creates encrypted information. The encrypted information is signed using the agent identity token, which in turn creates signed encrypted information. The signed encrypted information is communicated to the remote grid computer system by instructions stored in the agent executive. Throughout this system, a network connection is not established between the remote grid computer system and the agent executive.

In some embodiments, the agent executive comprises instructions for querying a command queue on the remote grid computer system for one or more commands. The command queue is accessed based upon an identity of the agent identity token. The agent executive comprises instructions for executing the one or more commands in the command queue.

In some embodiments, a command in the one or more commands updates a firewall policy for the agent executive or security module.

In some embodiments, a command in the one or more commands is a corrective or proactive protective action. A corrective action is an action configured to eliminate a cause of an identified or detected vulnerability. A proactive protective action is an action configured to eliminate a potential cause of a vulnerability in order to prevent an occurrence of the vulnerability.

In some embodiments, a command in the one or more commands is a request to repeat the collecting, encrypting, signing, and communicating at a predetermined time. For instance, in some embodiments the request is repeated each time a new container image is detected, each time a new container is instanced, each time a command is updated, and the like.

In some embodiments, a command in the one or more commands is a request to repeat the collecting, encrypting, signing, and communicating on a predetermined recurring basis. For instance, in some embodiments the request is repeated each day, each week, each month, each time a server is initiated, and the like.

In some embodiments, a first command in the one or more commands is an update to the agent self-verification factors. A second command in the one or more commands is a request to repeat the collecting, encrypting, signing, and communicating at a predetermined time. The second command uses the update to the agent self-verification factors. In some embodiments, the second command is repeated at a predetermined time interval. For instance, in some embodiments, the request of the second command is repeated at noon each day, each fortnight, and the like. In some embodiments, the request of the second command is repeated at a designated time each month (e.g., on a monthly basis), every twelve hours, and the like.

In some embodiments, a command in the one or more commands requires termination of the security module. In some embodiments, the terminated security module is restarted after completion of the termination.

In some embodiments, the first memory further comprises a virtual machine. The security module and the agent executive are then executed and associated with the virtual machine. In some embodiments, the virtual machine hosts one or more containers.

In some embodiments, the security module comprises a container engine. The container engine includes a container manager that is configured to manage a variety of containers and container images. The container engine also includes at least one container.

The security system further comprises a second server computer system, which is in electrical communication with the first security system. The second server computer system comprises one or more second processing units, and a second memory. The second memory is coupled to at least one of the one or more second processing units, and stores one or more registries. Each registry in the one or more registries comprises one or more container images. Each container image in the one or more container images of each registry in the one or more registries comprises one or more layers. Furthermore, a layer in the one or more layers of each respective container image in the one or more container images of each respective registry in the one or more registries is a writeable layer.

As noted above, in some embodiments, the agent executive comprises instructions for querying a command queue on the remote grid computer system for one or more commands, the command queue is accessed based upon an identity of the agent identity token, and the agent executive further comprises instructions for executing the one or more commands. In some embodiments, a command in the one or more commands creates an inventory of container images. The inventory spans across the one or more registries. An inventory of a container image includes a variety of information associated with the container image including but not limited to a name of a corresponding registry of the container image (e.g., Alpine), a container image tag (e.g., a version number), a container image identifier (e.g., a serial number), a use status of the container image (e.g., current {yes, no}), a discovery or detected date of the container image, a created date of the container image, and a last instanced date of the container image. In some embodiments, the command is repeated at a predetermined time. For instance, in some embodiments the predetermined time is when a new container image is instanced, when an update is pushed, when a server restarts, and the like. In some embodiments, the command is repeated on a predetermined recurring basis. For instance, in some embodiments the predetermined recurring basis is a first of each month, at noon each day, each time a container is instanced, and the like.

In some embodiments, a command in the one or commands scans a layer in the one or more layers of each respective container image for a vulnerability in the respective container image. In some embodiments, a layer in the one or more layers of each respective container image is the writeable layer. Layer vulnerabilities include, but are not limited to, network configuration vulnerabilities and lifecycle vulnerabilities.

In some embodiments, a command in the one or more commands scans a respective container image in the one or more container images for a vulnerability in the respective container image. In some embodiments, the scanning comprises extracting and instancing the respective container image from the second server system as a container on the first server computer system. Container image vulnerabilities include, but are not limited to, vulnerable packages within an image, image configuration hardening, image trust vulnerabilities, image verification vulnerabilities, and embedded secrets such as hidden layers in an image.

In some embodiments, a command in the one or more commands scans a respective container image in the one or more container images that has not been previously been scanned in order to identify a vulnerability in the respective container image.

In some embodiments, a command in the one or commands scans a respective container image in the one or more container images that has not been previously been scanned in order to identify a vulnerability in the respective container image.

In some embodiments, a command in the one or more commands maps a vulnerability in the one or more layers of a corresponding container image in the one or more registries.

In some embodiments, a command in the one or more commands detects a secret embedded in a container image in the one or more registries. Embedded container image secrets include, but are not limited to, hidden layers in an image, embedded links, rogue containers, and the like.

In some embodiments, a command in the one or more commands verifies a container image configuration hardening of a respective container image in the one or more registries. In some embodiments, the container image configuration hardening comprises a user access control of the container corresponding to the respective container image, a network configuration of the container corresponding to the respective container image, a process profile of the container corresponding to the respective container image, or a combination thereof.

In some embodiments, a command in the one or more commands verifies a container runtime configuration of a container image in the one or more registries.

In some embodiments, a command in the one or more commands verifies a daemon configuration in a container image in the one or more registries.

In some embodiments, a command in the one or more commands audits a lifecycle of a respective container image in the one or more container images. The lifecycle comprises a build, a distribution, and a run of the respective container image.

In some embodiments, a command in the one or more commands verifies one or more activities or one or more changes to a container image in the one or more registries.

In some embodiments, a command in the one or more commands creates a map between the one or more container images in the one or more registries on the second server system and the at least one container in the container engine on the first server computer system. The map is utilized to convey inter-relationships between container images, registries, and server systems.

In some embodiments, a command in the one or more commands creates groups between the one or more container images in the one or more registries on the second server system and the at least one container in the container engine on the first computer system. The groups are utilized to convey inter-relationships between vulnerabilities, container images, registries, and server systems.

In some embodiments, a command in the one or more commands runs a Center for Internet Security (CIS) benchmark audit on a respective container image in the one or more registries.

In some embodiments, a build log is compiled after each command in the one or more commands is completed. The build log is configured to store a history of a container or a container image. The history includes any notable changes to the container or the container images, times instanced, times duplicated, vulnerabilities detected, and the like.

In some embodiments, the querying and executing are repeated at a predetermined time. In some embodiments, the querying and executing are repeated on a predetermined recurring basis.

Another aspect of the present disclosure is directed to providing a grid computer system. The grid computer system comprises one or more processing units and a memory which is coupled to at least one of the one or more processing units. The memory stores a grid node. The grid node is executed by at least one of the one or more processing units. The grid node comprises instructions for receiving an API key from an agent executive running concurrently with a security module, which, in turn, is running on a computer that is remote to the grid computer system. The grid node further comprises instructions for determining whether the API key is a valid API key, and generating a unique agent identity token through a cryptographic token generation protocol when the instructions for determining deem the API key to be valid. The agent identity token is communicated to the security module running on the remote computer. Encrypted information is received, which is signed with a cryptographic digital signature, from the security module from an evaluation of the integrity of the agent executive based upon a plurality of agent self-verification factors. The receiving comprises decrypting the information using the agent identity token to form decrypted information and verifying the signature thereby obtaining decrypted, authenticated and integrity-verified information. Instructions are further stored for verifying the integrity of the agent executive based on the decrypted, authenticated and integrity-verified information.

Yet another aspect of the present disclosure is also directed to providing a grid computer system. The grid computer system comprises one or more processing units and a memory, which is coupled to at least one of the one or more processing units. The memory stores a grid node, and the grid node is executed by at least one of the one or more processing units. The grid node comprises instructions for receiving an alert from a first agent executive running concurrently with a first security module on a computer that is remote to the grid computer system. The alert indicates that the first agent executive has started running concurrently with the first security module and indicates a first agent identity token associated with the first agent executive. Instructions are stored for determining whether the first agent identity token is valid, and determining whether the first agent identity token is being used by a second agent executive running concurrently with a second security module. A second agent identity token is generated through a cryptographic token generation protocol when the first agent identity token is deemed valid by the first determining, and the second determining determines that the first agent identity token is being used by a second agent running concurrently with the second security module. The second agent identity token is communicated to the first security module.

Encrypted information is received which is signed by a digital signature from the first security module from an evaluation of integrity of the first agent executive based upon a plurality of agent self-verification factors. The receiving comprises decrypting the information using the second agent identity token in order to form decrypted information and validating the signature. The integrity of the first agent executive is verified based on the decrypted information when the signature has been validated.

In some embodiments, the grid node further comprises instructions for creating, as a function of the second agent identity token, a command queue on the grid computer system. The command queue is unique to the first agent executive. The grid node further comprises instructions for posting one or more commands to be executed by the first agent executive to the command queue.

A further aspect of the present disclosure is directed to providing a computer program product for use in conjunction with a computer system. The computer program product comprises a non-transitory computer readable storage medium and a computer program mechanism embedded therein. The computer program mechanism runs a security module and an agent executive. The agent executive comprises instructions for obtaining an agent API key from a user or by an automated process when the agent executive is executed a first time. The API key is communicated to a remote grid computer system, and an agent identity token is received from the remote grid computer system. The remote grid computer system generates the agent identity token through a cryptographic token generation protocol when the API key is deemed valid by the remote grid computer system. Instructions are further provided for storing the agent identity token in a secure data store associated with the agent executive. Information is collected on the computer system for an evaluation of integrity of the agent executive using a plurality of self-verification factions. The information collected by the collecting is encrypted, thereby creating encrypted information. The encrypted information is signed using the agent identify token thereby creating signed encrypted information. The signed encrypted information is communicated to the remote grid computer system. A network connection is not established between the remote grid computer system and the agent executive.

Another aspect of the present disclosure provides a security system. The security system comprises a first server computer system. The first server computer system comprises one or more processing units and a memory. The memory is coupled to at least one of the one or more processing units. A security module and an agent executive are stored in the memory. The security module maintains a plurality of containers. Moreover, the security module comprises a container engine that instances a container image as a container in the plurality of containers. The container engine comprises a container manager that manages the plurality of containers. The agent executive is executed by at least one of the one or more processing units, and is configured to run concurrently with the security module. The agent executive includes instructions for obtaining an agent application programming interface (API) key. In some embodiments, the agent executive obtains the API key from a user. In alternative embodiments, instead of obtaining the agent API key from the user, the agent API key is obtained by an automated process. In some instances, this automated process occurs when the agent executive is executed for a first time. Once the agent executive obtains the API key, it is communicated to a remote grid computer system. Responsive to this, an agent identity token is received from the remote grid computer system. The remote grid computer system generates the agent identity token through a cryptographic token generation protocol using the API key. This occurs when the API key is deemed valid by the remote grid computer system. Instructions are further stored in the agent executive for storing the agent identity token in a secure data store. This secure data store is associated with the agent executive. Information is collected on the first server computer system for an evaluation of integrity of the agent executive. This evaluation of integrity uses a variety of agent self-verification factors. The collected information is encrypted, which in turn creates encrypted information. The encrypted information is signed using the agent identity token, which in turn creates signed encrypted information. The signed encrypted information is communicated to the remote grid computer system by instructions stored in the agent executive. Throughout this system, a network connection is not established between the remote grid computer system and the agent executive.

The container security systems and methods of the present disclosure have other features and advantages that will be apparent from, or are set forth in more detail in, the accompanying drawings, which are incorporated herein, and the following Detailed Description, which together serve to explain certain principles of exemplary embodiments of the present disclosure.

Figure 1A:
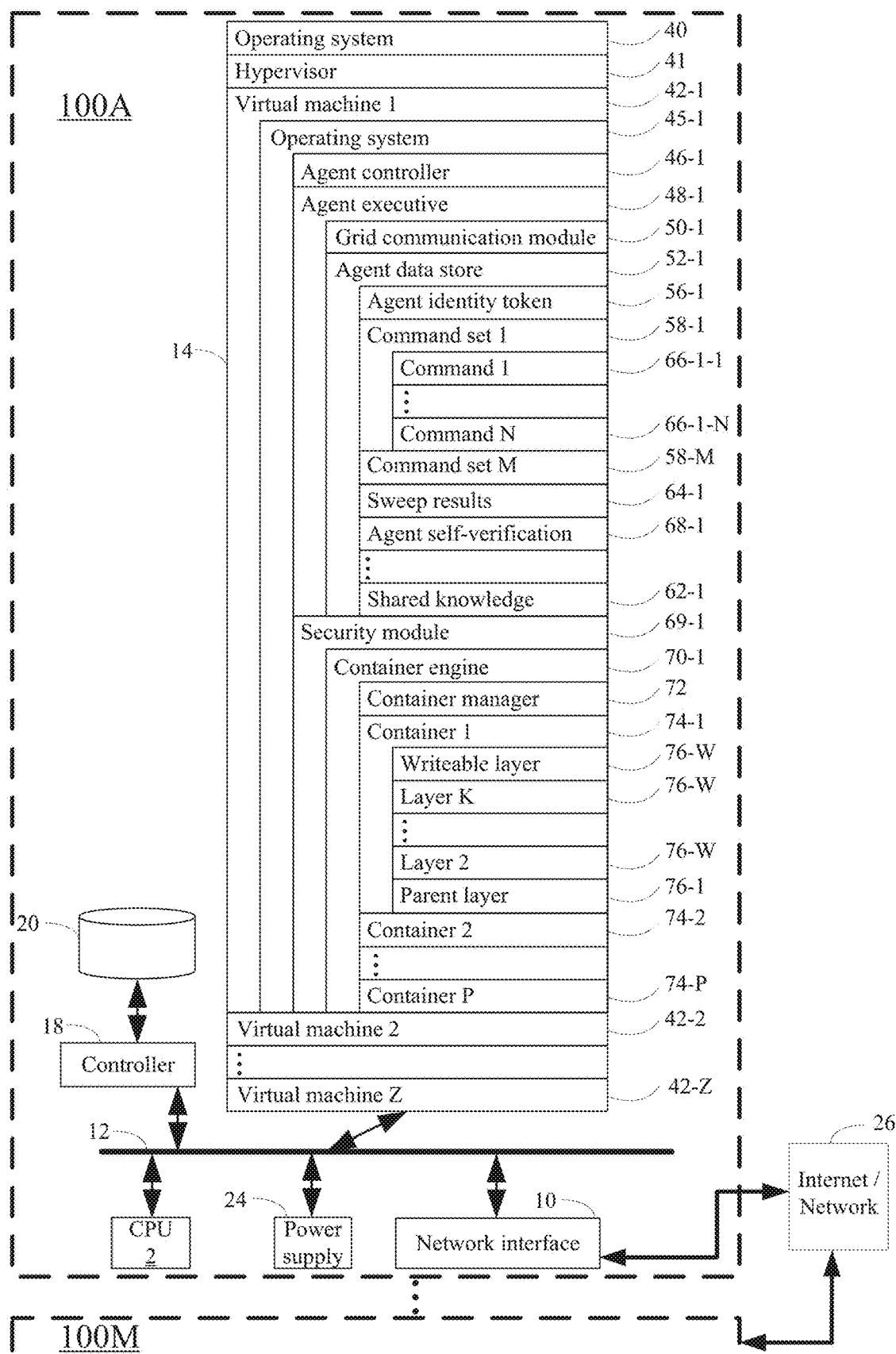
FIG. 1A illustrates a system in accordance with an embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Reference will now be made in detail to implementations, examples of which are illustrated in the accompanying drawings. In the following detailed description of implementations, numerous specific details are set forth in order to provide a thorough understanding of the present invention. However, it will be apparent to one of ordinary skill in the art that the present invention may be practiced without these specific details.

It will also be understood that, although the terms first, second, etc. may be used herein to describe various elements, these elements should not be limited by these terms. These terms are only used to distinguish one element from another. For example, a first container could be termed a second container, and, similarly, a second container could be termed a first container, without departing from the scope of the present disclosure. The first container and the second container are both containers, but they are not the same container. Furthermore, the terms "container image" and "image" are used interchangeably herein. Additionally, the terms "deployed" and "instanced" are used interchangeably herein.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "vulnerability" refers to a weakness or exposure in computational logic (e.g., code) comprised in software modules and hardware components of a computer system.

In some embodiments, computer systems and methods for providing container security in accordance with the present disclosure comprise an agent executive running concurrently with a security module. In some embodiments, when the agent executive is initially executed, it obtains an agent API key from a user. In other embodiments it obtains the agent API key from an automated process. This API key is communicated to a grid computer system. When the API key is deemed valid by the grid computer system, a cryptographic token generation protocol associated with the grid computer system generates an agent identity token. The agent identity token is received from the grid computer system and stored in a secure data store. The secure data store is associated with the agent executive. Information that evaluates the integrity of the agent executive is collected using a variety of agent self-verification factors. The collected information is encrypted and signed with the agent identity token. After being encrypted and signed, the information is communicated to the grid computer system. Commands are obtained from the grid computer system by the agent executive in order to check the security, compliance, and integrity of the computer system running the agent executive and/or processes running on this computer system. Based on the results of the check, additional commands are obtained by the agent executive from grid computer system to correct for security, compliance, and integrity problems, to prevent security comprises, or a combination thereof.

Some embodiments of the security systems and methods of the present disclosure are configured to provide to at least software vulnerability assessment (SVA), configuration security monitoring (CSM), server account monitoring (SAM), file integrity monitoring (FIM), log-based intrusion detection (LIDS), and/or continuous integration and continuous deployment (CI/CD) security to an administrator of a container, container image, and/or container registry.

A detailed description of a system in accordance with the present disclosure is described in conjunction with FIG. 1. As such, FIGS. 1A, 1B, 1C, and 1D collectively illustrate a topology of an environment in accordance with the present disclosure. In the topology, there is a server computer 100 (FIG. 1A), a grid computer system 200 (FIG. 1B), and a container registry 300 (FIG. 1C). Of course, other topologies are possible, for instance, grid computer system 200 can in fact be formed from several computers that are linked together in a network. Similarly, container registry 300 can in fact be formed from several registries on several computer systems that are linked together in a network. Further, there may be any number of server computers like that of the server computer 100 and functioning in the same manner as the server computer 100, where each such server computer is serviced by the grid computer system 200. Moreover, typically, there are hundreds, thousands, hundreds of thousands of server computers 100 or more. The exemplary topology shown in FIGS. 1A-1D merely serves to describe the features of an embodiment of the present disclosure in a manner that will be readily understood to one of skill in the art.

In some embodiments, a server computer 100 is any electronic device or process that is to be protected from infiltration. As such, exemplary server computers include but are not limited to a remote computer system at a predetermined internet protocol (IP) address, a data stack, a computer service implemented on a computer system, an IP port or a remote computer system. The server computer 100 will typically have one or more processing units (CPU's) 2, a network or other communications interface 10, a memory 14 (e.g., random access memory), one or more magnetic disk storage and/or persistent devices 20 optionally accessed by one or more controllers 18, one or more communication busses 12 for interconnecting the aforementioned components, and a power supply 24 for powering the aforementioned components. Data in memory 14 can be seamlessly shared with non-volatile memory 20 using known computing techniques such as caching. Memory 14 and/or memory 20 can include mass storage that is remotely located with respect to the central processing unit(s) 2. In other words, some data stored in memory 14 and/or memory 20 may in fact be hosted on computers that are external to server computer 100 but that can be electronically accessed by the server computer 100 over an Internet, intranet, or other form of network or electronic cable (illustrated as element 26 in FIG. 1A) using network interface 10.

In some embodiments, memory 14 comprises:
- an operating system 40 that includes procedures for handling various basic system services and for performing hardware dependent tasks;
- a hypervisor 41 for initiating one or more virtual machines 42 on the server computer 100;
- one or more virtual machines 42, each such virtual machine comprising an operating system 45 (e.g., a guest operating system) that includes procedures for handling various system services;
- an agent controller 46 that is always running when a virtual machine 42 or a container 74 is running, the agent controller ensuring that an agent executive 48 is always running when the virtual machine 42 or the container 74 is running;
- an agent executive 48 for providing security in a cloud computing environment, the agent executive 48 including:
  - a grid communication module 50 for communicating with a grid computer system 200 via one or more communication networks 26, such as the Internet, other wide area networks, local area networks (e.g., a local wireless network can connect the server computer 100 to the grid computer system 200), metropolitan area networks, etc.,
  - an agent data store 52, or instructions for accessing an agent data store 52, the agent data store 52 storing:
    - an agent identity token 56 that is uniquely associated with the agent executive 48
    - one or more command sets 58, each command set 58 comprising one or more commands 66 that are run by the agent executive 48,
    - sweep results 64 that are collected by agent executive 48 in response to commands 66 and/or agent self-verification factors 68,
    - agent self-verification factors 68 that are used to verify the integrity of the corresponding agent executive 48, and
    - shared knowledge 62 that is shared with a grid computer system 200; and
- a security module 69 that stores a container engine 70 for instancing one or more container images 374 as corresponding containers 74, the container engine 70 comprising a container manager 72 and zero or more containers 74.

The above referenced shared knowledge 62 serves to encrypt, decrypt, digitally sign and/or verify data and messages that are communicated between the server computer 100 and the grid computer system 200 as disclosed in further detail below. In some embodiments, direct communication from the remote grid computer system 200 to the agent executive 48 is not possible. Accordingly, the agent executive 48 cannot accept a network connection from any remote device and has no access to open network communication ports. Instructions are stored in a command queue on the grid computer systems that is uniquely linked to the agent executive 48 by the agent executive's agent identity token by the grid computer system 200. These instructions are obtained by the agent executive 48 using the agent identity token, which ensures the security of the agent executive 48.

Moreover, in typical embodiments the grid computer system 200 does not initiate communication with an agent executive 48 (e.g., running on a virtual machine 42) because the agent executive should not have open network ports. Instead, the agent executive initiates communication with the grid computer system 200 to pull information and/or obtain information (e.g., retrieve commands from a designated command queue 150).

As noted above, in some embodiments, memory 14 preferably stores a hypervisor 41 for initiating one or more hardware virtual machines 42. There may be any number of hardware virtual machines 42 running on the server computer 100. In some instances, there is only one hardware virtual machine 42 running on the server computer 100. In some instances, there are two or more, three or more, five or more, or ten or more hardware virtual machines 42 running on the server computer 100. In some instances, a single virtual machine 42 is running on multiple server computers 100.

As will be understood by one of skill in the art, there is individual persistent storage (e.g., of type 20) associated 1:1 with each virtual machine 42 residing on server computer 100. Such storage is where the virtual machine 42 operating systems 45 and files are stored and accessed, and in turn is where the agent binaries and encrypted databases (e.g., agent data store 52) are stored and accessed.

In some embodiments, a server computer 100 that utilizes the grid computer system 200 uses a single operating system 40, without a virtual machine 42. That is, the server computer 100 does not require a hypervisor 41 or virtual machine 42. In such embodiments, the agent executive 48 monitors and controls security of the single operating system 40, including the integrity of the agent executive 48 itself and the integrity of one or more containers 74 running on the server computer 100.

Although not stored in agent data store 52 or anywhere else on server computer 100, there is an agent API key that is uniquely associated with an organization (e.g., administrator), wherein the organization controls a respective agent executive 48. In some embodiments, there is an agent API key that is uniquely associated with a policy domain of a single organization (e.g., administrator), where the single organization desires to implement multiple policy domains, each of which is intended to control a discrete agent executive 48.

In operation, agent data store 52 is stored in memory 20, although some agent data is held in memory 14 of the virtual computer during operation.

Figure 1B:
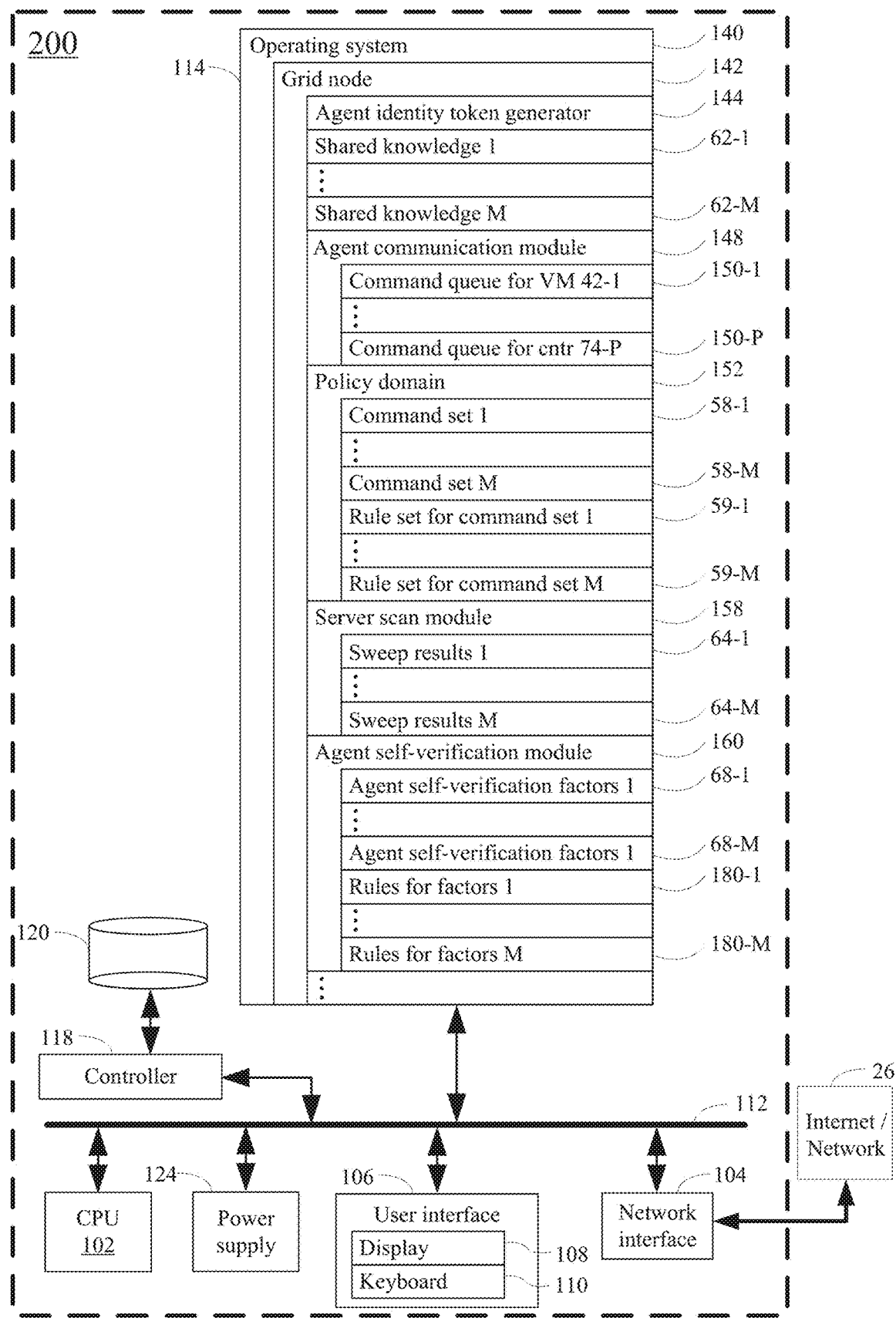
FIG. 1B illustrates a system in accordance with an embodiment of the present disclosure.
Figure 1C:
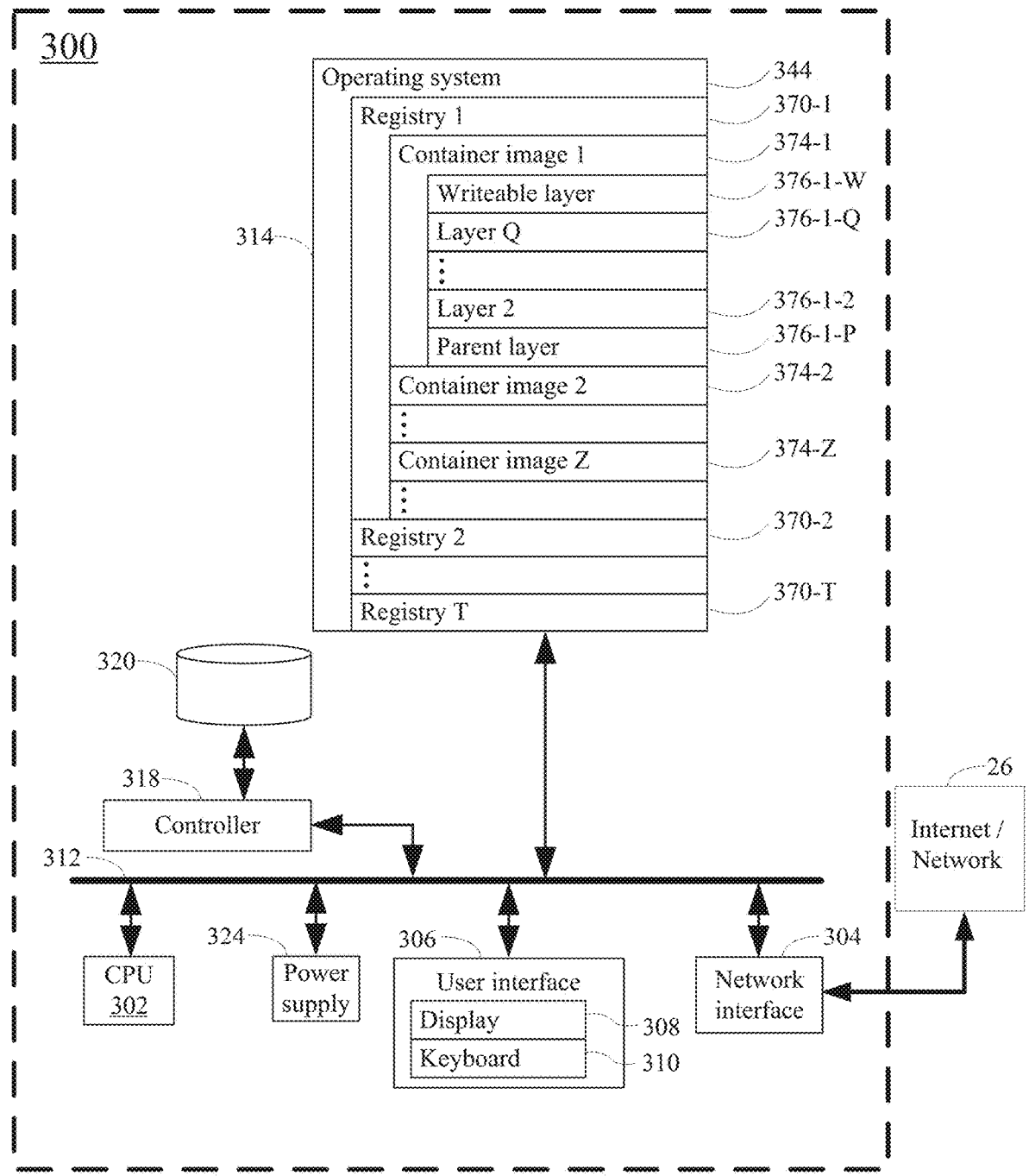
FIG. 1C illustrates a system in accordance with an embodiment of the present disclosure.

As described above, memory 14 preferably stores a container engine 70. The container engine 70 is configured to execute a variety of container images 374 from a container registry 300 (e.g., as illustrated in FIG. 1C). The container engine 70 instances the executed container image 374 as a uniquely corresponding new container 74 on the server computer 100. In some embodiments, the new container 74 is instanced within a virtual machine 42 on the server computer 100. A container manager 72 assists in the management of the containers 74, particularly in a cloud bursting context. The container manager 72 is configured to control the deployment of containers 74 as well as collect configuration information of deployed containers 74 on server computer 100. In some embodiments, there are any number of containers 74 running on each server computer 100 (e.g., container 74-1, container 74-2, . . . , container 74-P, where P is a positive integer, running on a server computer 100-A). In some instances, there is only one container 74 running on a server computer 100. A number of server computers 100 and a corresponding number of containers 74 deployed on each server computer 100 is not limited to any specific numbers. For instance, in some embodiments a first server computer 100-A has one container deployed while a second server computer 100-B has a hundred containers 74 deployed. The number of server computers 100 and containers 74 therein vary depending on various design that are all within the scope of the present disclosure.

Each container 74 comprises at least one layer 76. A layer 76 includes information used to deploy, instance, and build a container 74 from a container image 374. For instance, in some embodiments a layer 76 includes an operating system and preinstalled web application. Specific configurations and parameter values are instantiated when the layer 76 is deployed. Preferably, referring to FIG. 1C, each container image 374 comprises a parent layer 376-P (e.g., an original or base layer 376), at least one layer 376, and a writeable layer 376-W. In some instances, a container image 374 includes a single writeable layer 376-W. In some instances, a container image 374 includes a writeable layer 376-W and a parent layer 376-P. There may be any number of layers 376 in a container image 374. However, each container image 374 must include only one writeable layer 376-W. Within the layers 376 of a container image 374, only the writeable layer 376-W is editable by an administrator of the container image 374. Each layer 376 preceding the writable layer 376-W is a previous read-only version of the writeable layer 376-W. Similarly, each layer 376 proceeding the parent layer 376-P is a modified read-only version of the parent layer 376-P. In some embodiments, deploying or instancing a container image 374 as a new container 74 is accomplished by creating a new writeable layer 376-W. Layers 376 may reference or relate to one or more different layers. Layers 376 of a container image 374 have the same properties as layers 76 of a corresponding container 74.

Ensuring the security of the host computer (e.g., server computer 100) is essential in order to ensure the security of a container that is hosted on the host computer. For instance, if a host computer includes a vulnerability when a new container is instanced on the host computer, the vulnerability can manifest itself in the new container even when the image of the new container is deemed valid or safe by an agent executive while stored on a container registry.

One or more server computers 100 are able to establish a connection via Internet/network to grid computer system 200. FIG. 1A illustrates the connection to only one such server computer 100. In typical embodiments, a grid computer system 200 comprises one or more computers. For purposes of illustration in FIG. 1B, the grid computer system 200 is represented as a single computer that includes all of the functionality of the grid computer system 200. However, the disclosure is not so limited. The functionality of the grid computer system 200 may be spread across any number of networked computers and/or reside on each of several networked computers. One of skill in the art will appreciate that a wide array of different computer topologies is possible for the grid computer system 200 and all such topologies are within the scope of the present invention. These different topologies will be described in detail infra. Turning to FIG. 1B with the foregoing in mind, an exemplary grid computer system 200 comprises:

one or more processing units (CPU's) 102;
a network or other communications interface 104;
a memory 114;
optionally, one or more magnetic disk storage and/or persistent storage devices 120 accessed by one or more optional controllers 118;
a user interface 106, the user interface 106 including a display 108 and a keyboard or keypad or other data entry device 110;
one or more communication busses 112 for interconnecting the aforementioned components; and
a power supply 124 for powering the aforementioned components.

It will be appreciated that in typical embodiments, user interface 106, display 108, and other data entry devices 110 are not part of a grid computer system 200. In fact, in typical embodiments, the grid computer system 200 is a virtual machine itself.

In some instances, data in memory 114 can be seamlessly shared with optional non-volatile memory 120 using known computing techniques such as caching.

The memory 114 preferably stores:

an operating system 140 that includes procedures for handling various basic system services and for performing hardware dependent tasks; and
a grid node 142 for providing security in a cloud computing environment, the grid node storing:
an agent identity token generator 144 for generating an agent identity token 56 using a cryptographic token generation protocol when an agent API key provided by an agent executive 48 is deemed valid,
shared knowledge 62 for each of one or more agent executives 48 running on one or more remote server computers 100, such shared knowledge enabling encryption of information that is exchanged between the agent executives 48 and the grid computer system 200,
an agent communication module 148 that is used to communicate commands to one or more virtual machines 42 running on one or more remote server computers 100, one or more containers 74 running on one or more remote server computers 100 and/or virtual machines 42 running on the remote server computer 100, the agent communication module 148 including a command queue 150 for each such virtual machine 42 and/or container 74, whereby the agent communication module 148 posts commands for a respective agent executive 48 to the command queue 150 that uniquely corresponds to the virtual machine 42 or server computer 100 on which the respective agent executive 48 runs;
a policy domain 152 comprising one or more command sets 58 and one or more rule sets 59, where for each command set 58 there is a corresponding rule set 59, each command set 58 including one or more commands 60, where each such command 60 directs an agent executive 48 to acquire information or perform a task and report back to the grid computer system 200 the status of the task and where each rule set 59 is for processing information provided by an agent executive 48 to the grid computer system 200 upon completion of a corresponding command set 58;
a server scan module 158 which collects information and/or the status of completed tasks upon completion of a command set 58 and stores such data as sweep results 64, each such sweep result uniquely corresponding to a hardware virtual machine 42 or a container 74 serviced by the grid computer system 200; and
an agent self-verification module 160 which keeps an up-to-date list of the agent self-verification factors 68 that are necessary to verify an agent executive 48 running on each virtual machine 42 or each container 74 serviced by the grid computer system 200 as well as rules 180 for processing these factors.

Agent self-verification module 160 comprises agent self-verification corrective command sets 58 and agent self-verification failsafe commands 60 in addition to agent self-verification factors 68. Agent self-verification corrective command sets and agent self-verification failsafe command sets comprise the actual commands 60 used to attempt correct an integrity failure, and in the event that self-correction fails, the failsafe actions to be taken (e.g., alert an administrator, shut down the agent executive 48, shut down the virtual machine 42, shut down the container 74, shut down the container engine 70, etc.)

The agent identity token 56 is uniquely associated with an agent executive 48. As disclosed below, the agent identity token 56 is the data by which the uniquely associated agent executive 48 is identified and authenticated to the grid computer system 200. The agent identity token 56 along with shared knowledge 62 is used (i) by the grid communication module 50 to encrypt and sign any message posted to the grid computer system 200, (ii) the agent communication module 148 to decrypt, authenticate the sender of, and verify the integrity of any message received from an agent executive 48, (iii) the agent communication module 148 for encrypting and signing any message intend for receipt by an individual agent executive 48 (e.g., through the command queue for the agent executive); and (iv) the grid communication module 50 to decrypt, authenticate the sender of, and verify the integrity of any message obtained from a command queue on the grid computer system 200.

One or more server computers 100 and the grid computer system 200 are able to establish a connection via Internet/network to container registry 300. For purposes of illustration in FIG. 1C, the container registry 300 is represented as a single computer that includes all of the functionality of the container registry 300. However, the disclosure is not so limited. The functionality of container registry 300 may be spread across any number of networked computers and/or reside on each of several networked computers. One of skill in the art will appreciate that a wide array of different computer topologies is possible for the container registry 300 and all such topologies are within the scope of the present invention.

Turning to FIG. 1C with the foregoing in mind, a container registry 300 comprises:
one or more processing units (CPU's) 302;
a network or other communications interface 304;
a memory 314;
optionally, one or more magnetic disk storage and/or persistent storage devices 320 accessed by one or more optional controllers 318;
a user interface 306, the user interface 306 including a display 308 and a keyboard or keypad or other data entry device 310;
one or more communication busses 312 for interconnecting the aforementioned components; and
a power supply 324 for powering the aforementioned components.

It will be appreciated that in typical embodiments, user interface 306, display 308, and other data entry devices 310 are not part of a container registry. In fact, in typical embodiments, the container registry is a virtual machine itself.

In some instances, data in memory 314 can be seamlessly shared with optional non-volatile memory 320 using known computing techniques such as caching.

The memory 314 preferably stores:
an operating system 344 that includes procedures for handling various basic system services and for performing hardware dependent tasks; and
one or more registries 370 (e.g., Docker Hub, Quay, Amazon Elastic Container Registry (ECR), Azure Container Registry (ACR), Google Cloud Registry (GCR), jFrog, etc.), each storing one or more images 374, each image 374 representing a different version of a same type (e.g., Alpine, CentOS, Debian, Linux, RancherOS, RHEL, Ubuntu, etc.) of container 374.

In the present embodiment, the container registry 300 comprises a variety of registries 370, such that there is a one-to-many relationship between the container registry 300 and the variety of registries 370. For instance, in one embodiment a container registry 300 comprises a Docker Private Registry 370-1, a Docker Trusted Registry 370-2, and an Amazon Elastic Container Registry 370-3. Accordingly, in some embodiments a container registry 300 comprises a single registry 370, such that there is a one-to-one relationship between the container registry 300 and the registry 370. For instance, in one embodiment a container registry 300-1 comprises a Docker Private Registry 370-1, another container registry 300-2 comprises a Docker Trusted Registry 370-2, and yet another container registry 300-3 comprises an Amazon Elastic Container Registry 370-3. In some embodiments, there are two or more container registries 300, three or more container registries 300, five or more container registries 300, ten or more container registries 300, or a hundred or more container registries 300. In some embodiments, each registry 370 of a container registry 300 is in fact a repository of the container registry 300.

Images 374 are containers 74 that have yet to be launched, deployed, or instanced on the server computer 100. Thus, a container 74 is a runnable instance of an image 374. A container 74 is defined by a corresponding image 374 as well as configuration options provided when the container 74 is instanced or deployed. An image 374 is a read-only template comprising instructions for creating a container 74. As previously described, images 374 typically include at least one layer 376. Typically, a layer 376 is based on at least one other layer 376 (e.g., layer 376-3 is based on layer 376-2, or layer 376-3 is based on a combination of layer 376-1 and layer 376-2), with some additional customization. For example, a client may create an image (e.g., image 374-2 of FIG. 1C) of a container (e.g., container 74-2 of FIG. 1A) which is based on a public Ubuntu image (e.g., image 374-1 of FIG. 1C), but is configured to install an Apache web server and a web application of the client. This image 374 created by the client also installs configuration details required to run the web application of the client. Images 374 can be created by other people and published in a registry 370, which is either private or public. Images 374 can also be created by a client, and optionally stored locally on a remote client device. When an existing image 374 is modified, only the corresponding layer(s) 376 associated with the change are modified.

In some embodiments, the container registry 300 is in electronic communication with a connector agent (e.g., an agent executive 48). The connector agent is configured to inventory and analyze the images hosted by the container registry and works in concert with the agent executive 48 of the server computer 100 to protect operating systems, virtual machines, containers, and applications from vulnerabilities.

Registry 370 allows an administrator of a container image 374 to push, pull, and/or manage a variety of container images from any server computer, virtual machine instance, device, or hardware that is accessible to the administrator.

The registry 370 prevents the server computer 100 from becoming bloated with container images 374, ensuring a quick launching environment for deploying new containers 74.

Figure 1D:
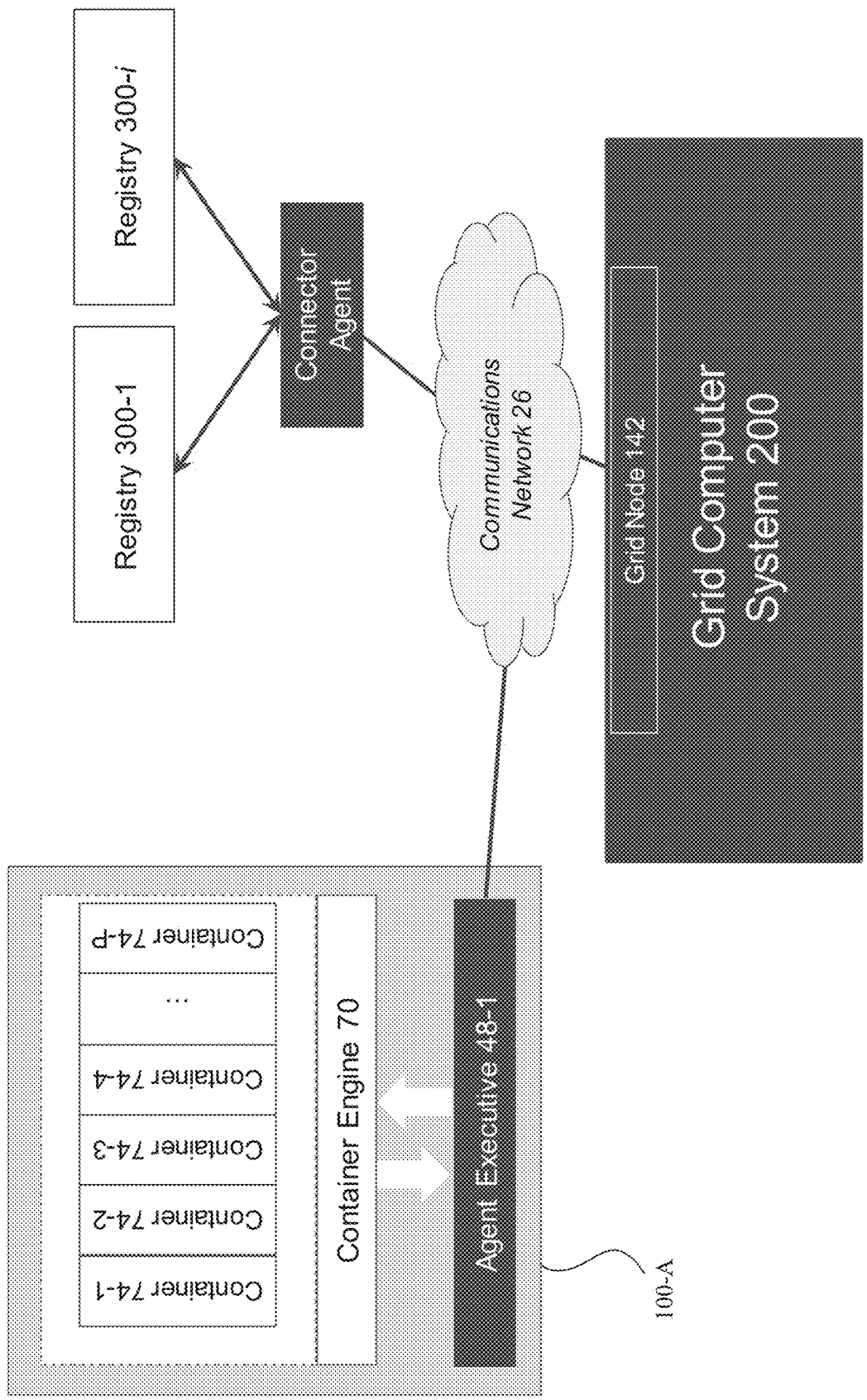
FIG. 1D illustrates a system in accordance with an embodiment of the present disclosure.

Referring to FIG. 1D, the exemplary topology of an environment for securing deployment of one or more containers 74 is illustrated in accordance with the present disclosure. As noted above, in the topology there is a grid computer system 200, one or more container registries 300 (e.g., container registry 300-1, container registry 300-2, ..., container registry 300-i, etc.) that store container images 374, a server computer 100-A that includes an agent executive 48 and container engine 70, and an optional communications network 26. As depicted in FIG. 1D, in some embodiments a connector agent (e.g., an executive agent 48-2) is included to communicate with the grid computer system 200 and assist in creating an inventory of images 374 of the container registries 300. However, the present disclosure is not limited to the topology depicted in FIG. 1D.

In some embodiments, the container registry 300 is subsumed by the server computer 100 or spread across one or more server computers 100. The subsuming of the container registry 300 by the server computer 100 does not affect the systems and methods of the present disclosure. For instance, in some embodiments the server computer 100 includes a virtual machine 42 which is used to instance new containers 74 from a registry (e.g., repository) that is stored locally on the server computer 100. The virtual machine 42 protects the local server computer 100-A from vulnerabilities that are included in the new containers 74 through virtual machine-to-local resource relationships and protocols.

Initiation of a Container 74, an Agent Controller 46, and an Agent Executive 48 on a Server Computer 100.

Figure 2:
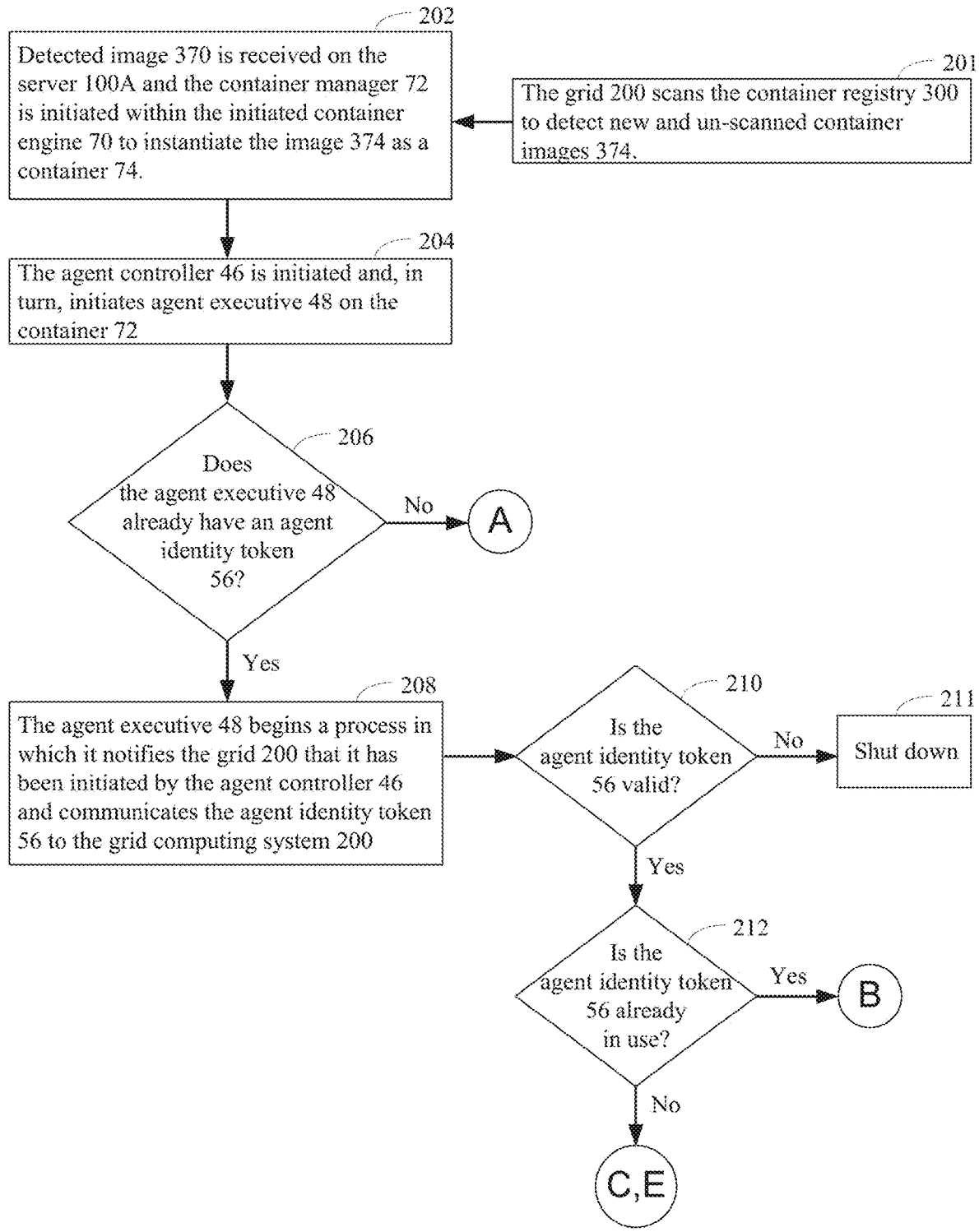
FIG. 2 illustrates the initiation of a container, agent controller, and agent executive, in accordance with an embodiment of the present disclose in which the agent executive may or may not have an agent identity token in accordance with an embodiment of the present disclosure.

FIG. 2 illustrates how a server computer 100 is initiated in accordance with a first embodiment of the present disclosure.

Block 201.

In block 201, the grid computer system 200 scans a second computer system 300 (e.g., container registry 300). In some embodiments, the scanning is passive such that the grid computer system 200 is continuously scanning, or scanning at a particular frequency (e.g., every minute, every hour, every day, every push or pull of an image 374, etc.), for images 374. Likewise, in some embodiments the scanning is active such that the server computer 100, the grid computer system 200, or the container registry 300 dictates when the scanning occurs. The scanning is configured to detect and register new images 374 (e.g., an image 374 that was created after a previous scan), detect and register un-scanned images 374 (e.g., an image 374 that was omitted from a previous scan), and/or a combination thereof. In some embodiments, when a scan has not previously occurred, the scanning is configured to detect and register each image 374 of each registry 370 of the container registry 300. In some embodiments, the grid computer system 200 scans a specific registry (e.g., registry 370-2) from a selection of registries 370 in the container registry 300. In some embodiments, the grid computer system 200 scans each registry 370 in each container registry 300.

Block 202.

In block 202, once an image 374 is detected for analysis in block 201, the image 374 is pulled from the container registry 300 and deployed, or instanced, to the server computer 100 as a corresponding container 74. The detected image 374 is deployed in order to identify vulnerabilities in the image 374. The container engine 70, which includes the container manager 72, is initiated on the server computer 100 in order to instantiate the image 374 as a corresponding container 74. In some embodiments, the container engine 70 is always running on the server computer 100. Additional details regarding deployment of container images are found at Docket Documentation on the Internet at docs.docker.com, accessed March 2018. In some embodiments, the hypervisor 41 initiates a virtual machine 42 on the server computer 100, and an operating system 45 is initiated within the virtual machine 42. The hypervisor 41, also called a virtual machine manager (VMM), is any one of many hardware virtualization techniques that allow multiple operating systems 45 to run concurrently on the server computer 100. The hypervisor 41 presents to each of the guest operating systems 45 a virtual operating platform and manages the execution of such operating systems. Multiple instances of a variety of operating systems 45 may share the virtualized hardware resources. Commercial embodiments of the hypervisor 41 include, but are not limited to, OPENSTACK, EUCALYPTUS, VMWARE ESXI, CITRIX XENSERVER, MICROSOFT HYPER-V HYPERVISOR, SUNS LOGICAL DOMAINS HYPERVISOR, and HP's INTEGRITY VIRTUAL MACHINES. Examples of operating systems 45 include, but are not limited to UNIX, OPEN VMS, LINUX, RANCHEROS, VMware, PHOTON, and MICROSOFT WINDOWS. Once the operating system 45-1 of the virtual machine 42-1 is running, a container engine 70 (e.g., container engine 70-1 of virtual machine 42-1 of FIG. 1A) and corresponding container manager 72 are initiated in the virtual machine 42-1. Thus, the present disclosure applies to containers 74 running on the server computer 100 as well as containers 74 running on virtual machines 42 running on the server 100. In the interest of brevity and clarity, the systems and methods of the present disclosure will be described in terms of containers 74 running on the server computer 100. However, one skilled in the art will recognize that the systems and methods of the present disclosure are applied similarly to containers 74 running on virtual machines 42 running on the server computer 100.

Block 204.

Either before or after the container 74 is running on the server computer 100, an agent controller 46 is initiated. A responsibility of the agent controller 46 is to ensure that an agent executive 48 is running on the server computer 100. Thus, in block 204, the agent controller 46 initiates the agent executive 48 on the server computer 100. In some embodiments, a responsibility of the agent controller 46 is to ensure that an agent executive 48 is running on the virtual machine 42 comprising the container 74 at all times. Thus, in block 204, the agent controller 46 initiates the agent executive 48 on the hardware virtual machine 42.

Block 206.

In block 206, a determination is made by the agent executive 48 as to whether it already has an agent identity token 56 assigned to it. In some instances, an agent executive 48 may already have an agent identity token assigned to it if the server computer 100 including the container 74 corresponding to the agent executive 48 had been running before and had stopped running, because of a power outage or computer hardware failure for example, but is now once again running. In some instances, an agent executive 48 may already have an agent identity token 56 assigned to it if the server computer 100 and container 74 corresponding to the agent executive 48 is a cloned copy of another container 74 that is also running. If the agent executive 48 does not have agent identity token 56 (206—No), then process control passes to block 302 of FIG. 3A, which describes how an API key is obtained. If the agent executive 48 does have an agent identity token 56 (206—Yes), then process control passes to block 208.

Block 208.

In block 208, the agent executive 48 begins a process in which it notifies the grid computer system 200 that the agent executive 48 has been initiated by the agent controller 46. Further, as part of this process, the agent executive 48 communicates the agent identity token 56 to the grid computing system 200.

Block 210.

In block 210, the grid computer system 200 receives the agent identity token 56 from the server computer 100 and determines whether it is valid. This is done by checking the agent identity token 56 against a list of such tokens that is maintained by the grid computer system 200 in memory 114 and/or memory 120 or that is otherwise accessible to the grid computer system 200. If validation is successful in block 210 (210—Yes), process control passes to block 212. If validation is not successful in block 210 (210—No), the agent executive 48 is notified of this failure and process control passes to block 211.

Block 211.

In block 211, an instruction is obtained from the grid computer system 200 to the agent executive 48 to shut it down. Optionally, an alert is sent to the user to advise that there was an attempt to utilize an invalid agent identity token 56.

Block 212.

Block 212 is reached if agent executive 48 is operating with a valid agent identity token 56. Block 212 is necessary to accommodate cloud bursting in which multiple virtual machines 42, termed children virtual machines, are concurrently executed, where each such child virtual machine 42 is based upon a common parent virtual machine 42 that may still be executing or that may be an inactive virtual machine image 42 upon which agent executive 48 has been previously configured, or has been previously scanned by the agent executive 48. Such cloud bursting processes have the benefit of providing dynamic servicing of loads that vary in computational intensity over time. For instance, in some embodiments, the parent virtual machine 42 hosts one or more retail modules (not shown in FIG. 1A) that service retail transactions over the Internet. During times of peak demand, such as for sales or during the holidays, the demand on the one or more retail modules increases. To service such demand, multiple children virtual machine 42 may each be generated based on the already implemented parent virtual machine 42. In such instances, each child virtual machine 42 will initially have the same agent identity token 56. In order to uniquely identify and provide adequate security to each of the child virtual machine 42, each such child virtual machine 42 is provided with new a unique agent identity token 56. Thus, if a determination is made that agent identity token 56-1 is a duplicate of an already active agent identity token (e.g., one that is being used by an another activated agent executive 48) (212—Yes), then process control passes to block 320 of FIG. 3B. If a determination is made that agent identity token 56-1 is not a duplicate of an already active agent identity token (212—No), then the determination is made that this executive agent 48 is associated with a previously deactivated virtual machine 42 that has been re-activated and process control passes either to block 409 (FIG. 4A) in order to self-verify the virtual machine 42 or, if the agent executive of the virtual machine 42 is already validated, to step 502 (FIG. 5) to begin a sweep.

Although containers are subject to cloud bursting in a manner similar to virtual machines, cloud bursting is less of a concern for containers when the containers are secured by the systems and methods of the present disclosure. As noted above, a container image is pulled from a registry, instanced as a container on a server computer, and scanned for vulnerabilities. Once the instanced container is determined to be secure, the corresponding container image is deemed to be secure by way of the instanced container. Accordingly, all containers that are subsequently instanced from the container image, which has been deemed secure, will also be secure.

Processes by which an Agent Executive can Acquire a Unique Agent Identity Token in Accordance with the Present Disclosure.

Figure 3A:
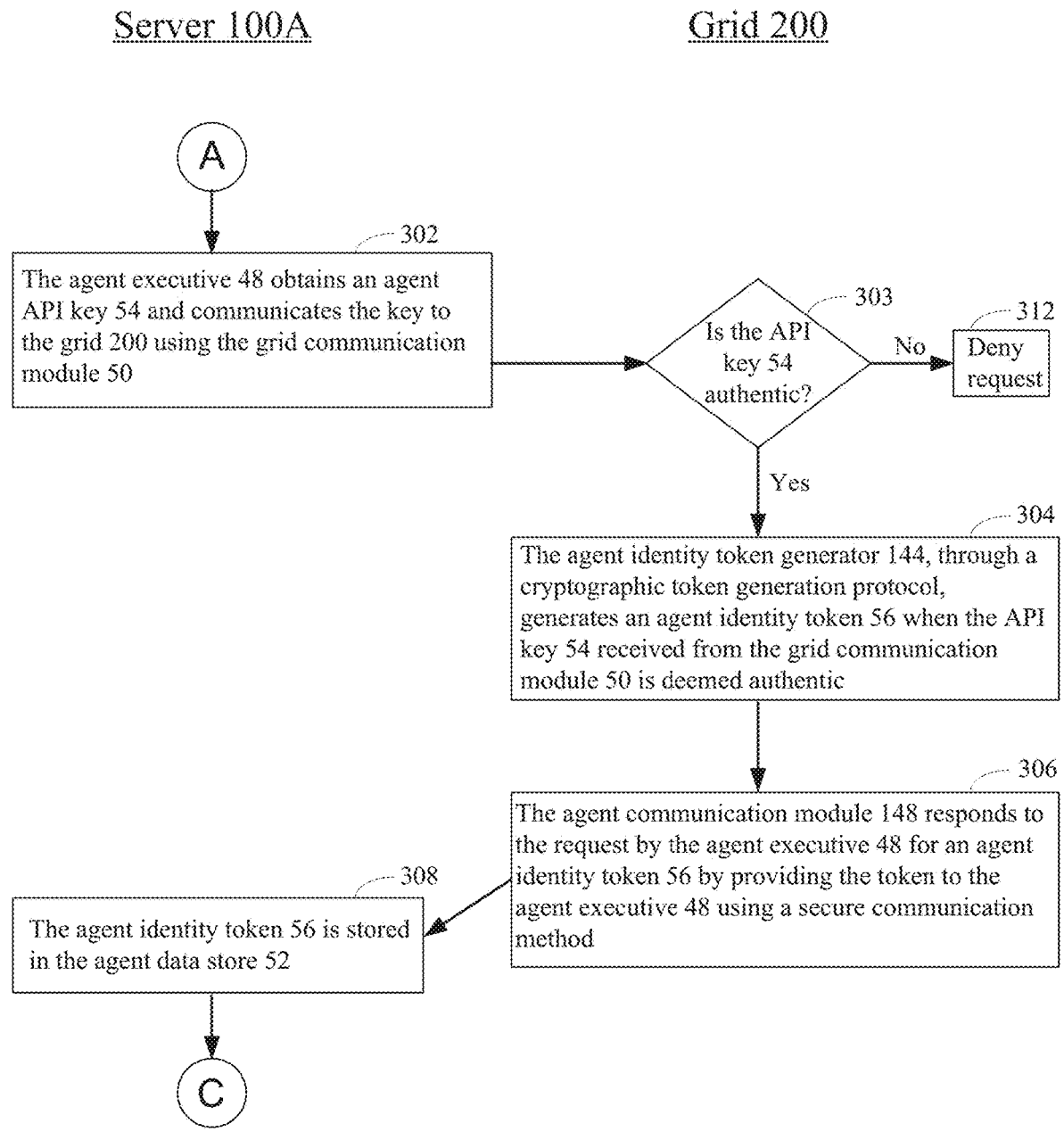
FIG. 3A illustrates processes by which an agent executive can acquire a unique agent identity token in accordance with an embodiment of the present disclosure.
Figure 3B:
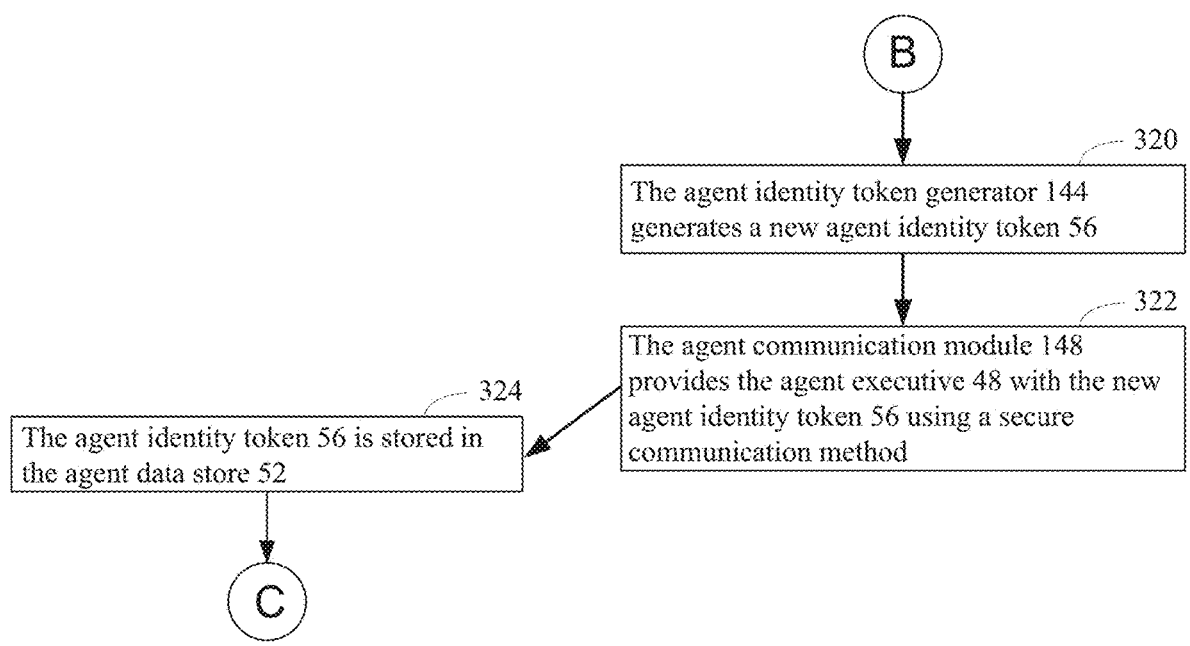
FIG. 3B illustrates processes by which an agent executive can acquire a unique agent identity token in accordance with an embodiment of the present disclosure.

FIG. 3 illustrates processes by which agent identity tokens 56 are generated in accordance with the present disclosure. A first process, exemplified by blocks 302 through 308 in FIG. 3A, is used when an agent executive 48 does not have an agent identity token 56 (206—No). A second process, exemplified by blocks 320 through 324 in FIG. 3B, is used when a first agent executive 48 has an agent identity token 56 but the agent identity token is already being used by an active virtual machine 42 that was initiated before the virtual machine 42 associated with the first agent executive 48 was executed (212—Yes).

Block 302.

Agent executive 48 does not have an agent identity token 56 when initiated for the first time with a virtual machine 42 or server computer 100 to ensure security of the virtual machine 42 or server computer 100. If block 302 is reached, this means that the agent executive 48 does not have an agent identity token 56. In block 302, the agent executive 48 obtains an agent API key. In some embodiments, the agent executive 48 challenges a user for an API key. In typical practice, the user provides the API key manually or via a user-provided script when the agent executive 48 is started for the first time. Regardless of how the API key is obtained it is communicated to the grid computer system 200 using the grid communication module 50 and process control passes to block 303.

Block 303.

In block 303, a determination is made as to whether the API key is authentic. If so (303—Yes), process control passes to block 304. If no (303—No), process control passes to block 312 where the request for an agent identity token 56 is denied. The user is notified of this failure.

Block 304.

In block 304, an agent identity token generator 144 operating on the grid computer system 200 generates, through a cryptographic token generation protocol, an agent identity token 56 when the API key received from the grid communication module 50 in block 302 is deemed valid. Any one of a number of cryptographic token generation protocols may be used to generate the agent identity token 56 from the API key.

Block 306.

In block 306, the agent communication module 148 responds to the request by the agent executive 48 for an agent identity token 56 by providing the token to the agent executive 48 using a secure communication method.

Block 308.

In block 308, the agent identity token 56 is stored in the agent data store 52 and process control passes to block 409.

Block 320.

Block 320 begins another process by which a first agent executive 48 may acquire an agent identity token 56. Block 320 is reached in those instances where the first agent executive 48 actually has a valid agent identity token 56, but the agent identity token 56 is already being used by a second active agent executive 48 of a second virtual machine 42 (parent virtual machine) that was initiated at an earlier date than the first virtual machine (212—Yes) (child virtual machine). In such instances, a new agent identity token 56 is generated for the child virtual machine 42 through a cryptographic token generation protocol.

Block 322.

In block 322, the agent communication module 148 responds to the request by the agent executive 48 for an agent identity token 56 by providing the token to the agent executive 48 using a secure communication method such as the methods disclosed in the section entitled "Message Security Protocol" below.

Block 324.

In block 324, the agent identity token 56 is stored in the agent data store 52 for later use and process control passes to block 409. In preferred embodiments, agent identity token 56 is stored in a persistent data store (e.g., agent data store 52) maintained by agent executive 48. In preferred embodiments, this persistent data store is encrypted at all times using the Advanced Encryption Standard (AES) in Cipher Block Chaining (CBC) mode utilizing a 256-bit key length as described in Federal Information Processing Standards (FIPS) Publication 197, Nov. 26, 2001. In such embodiments, the key and initialization vector required by the agent executive 48 to access encrypted information in the persistent data store, including but not limited to the agent identity token 56, is calculated using multiple data values some based on shared knowledge 62 and some dynamically generated on a one-time basis, that are provided by the remote grid computer 200. This calculation involves agent executive 48 invocation of one of a plurality of possible dynamic key generation protocols, a non-limiting example of which is the Dynamic Symmetric Key Provisioning Protocol (DSKPP). See the Internet as tools.ietf.org/search/rfc6063.

Message Security Protocol.

The processes illustrated in FIG. 3B provide methods for securing an agent identity token 56 in agent data store 52. As discussed in further detail below, FIGS. 4A-4B through FIGS. 6A-6B illustrate exemplary processes directed to verifying the integrity of a container 74 and performing services for container 74 (e.g., imposition of a firewall) that require assignment of a unique agent identity token 56 to the server computer 100 or virtual machine 42 that hosts the container 74. These exemplary processes further require communication to take place between agent executive 48 and the grid computer system 200. It is desirable that such communications take place in a manner that provides for message confidentiality and integrity. Further, it is desirable that the agent executive 48 and remote grid computer 200 be mutually able to authenticate the source of a message for the purposes of identification and authorization. To accomplish this, a secure messaging protocol is used. This secure messaging protocol, in combination with an agent executive self-verification process described below in conjunction with FIGS. 4A-4B, and the use of unique agent identity tokens 56, satisfy the need for the agent executive 48 to be able to securely operate and communicate with the remote server computer 100 in a relatively untrusted and/or uncontrolled environment, including the transmission of messages across untrusted and/or uncontrolled network environments.

In some embodiments, after agent executive 48 initialization, any message of any type that is generated by the grid computer system 200 to send to the agent executive 48, or by an agent executive 48 to send to the grid computer system 200, is protected from unauthorized disclosure, corruption, replay or spoofing using the disclosed message security protocol. As described in further detail below, the sender of a message assures message authenticity and integrity by utilizing a hash-based message authentication code (HMAC) functionality, in combination with dynamically generated key based on shared secret knowledge between the sender and receiver, to generate a keyed message digest of the message payload. This digest is added to the original message payload, which is then encrypted utilizing the message confidentiality functionality described below, utilizing a dynamically generated key based on shared secret knowledge between the sender and receiver.

The resulting ciphertext is transmitted to the receiver using a mutually authenticated, encrypted network tunnel. In some embodiments, this transmission is secured using an SSL/TLS protocol. TLS and SSL encrypt the segments of network connections above the transport layer using asymmetric cryptography for transmission confidentiality and a keyed message authentication code for transmission integrity and reliability (see RFC 5246 or the Internet at en.wikipedia.org/wiki/Secure Sockets Layer).

The receiver of the message first decrypts the ciphertext after re-creating the symmetric encryption key based on shared secret knowledge between the sender and receiver. If the sender asserted as part of the transmission metadata did not actually send the message, then the shared secret knowledge will be incorrect and the ciphertext will not be successfully decrypted into a meaningful data structure. In such cases the message will be ignored and the receiver may take actions including triggering mechanisms to generate an alert to a possible attempt to compromise security. If the ciphertext is successfully decrypted, the receiver then attempts to further verify authenticity and integrity of the message by re-generating the asserted HMAC message digest included with the message using a key re-generated based on shared secret knowledge between the sender and receiver. The message digest generated by the receiver will not match the asserted message digest and the message will be considered inauthentic and/or corrupted by the receiver if the sender asserted as part of the transmission metadata did not actually generate the HMAC message digest of the message, or if the message has been changed in any fashion since generation of the HMAC digest. In such cases, the message will be ignored and the receiver may take actions including triggering mechanisms to generate an alert to a possible attempt to compromise security. If the decipherment and message authentication/integrity checks are both successful, the receiver will process the message.

Message Authenticity and Integrity.

In order to ensure the authenticity and integrity of such communications, one of a plurality of possible hash-based message authentication code (HMAC) functions is used (see, for example, IETF RFC 2104, "HMAC: Keyed-Hashing for Message Authentication"). These HMAC functions utilize one or more secure hashing algorithms such as SHA-224, SHA-256, SHA-384, or SHA-512, as defined more fully in Federal Information Processing Standards Publication 180-3 ("Secure Hash Standard (SHS)"), October 2008. In this messaging security protocol functionality, secret key material used to implement the HMAC is derived by means of a dynamic key generation algorithm mutually known to both the agent executive 48/grid communication module 50 and the remote grid computer system 200. Such key generation utilizes a plurality of encryption, hashing and randomization protocols, non-limiting examples of which include AES-256-CBC, the SHA-224 hashing algorithm, and/or the SHA-256 hashing algorithm. In some embodiments, such algorithms are combined into a multi-pass protocol that use as inputs key materials and/or initialization vectors generated from shared knowledge 62 between the grid communication module 50 and the remote grid computer system 200 and values derived from pseudo-random number generation protocols. This algorithm generates secret key material of preferable length no less than 1024 bits, implementing a cryptographic keyspace of a size making it computationally infeasible to check each possible key by brute force. Prior to encryption, this secret key material is used as input to one of a plurality of HMAC implementations such as HMAC-SHA-224, HMAC-SHA-256, HMAC-SHA-384, or HMAC-SHA-512 (see FIPS 180-3). The effect of this combination of cryptographic techniques is implementation of a keyed message digest universally unique to each individual message, with the keyed message digest ensuring that a message may be authenticated and verified for integrity only by the grid computer system 200 and the individual, universally unique agent executive 48/grid communication module 50 that generated a message or for which a message was intended.

Message Confidentiality.

In some embodiments, confidentiality of messages shared between the agent executive 48 and the remote grid computer 200 is assured utilizing encryption of message payload with AES in CBC mode utilizing a 256-bit key length. The symmetric key used for encryption is derived by means of a dynamic key generation algorithm mutually known to both the agent executive 48 and the remote grid computer system 200. This key generation algorithm utilizes one of a plurality of encryption, hashing and randomization protocols, non-limiting examples of which include AES-256-CBC, the SHA-224 hashing algorithm, and the SHA-256 hashing algorithm. In some embodiments, these algorithms are combined into a multi-pass protocol that use as inputs key materials and/or initialization vectors generated from shared knowledge 62 between the agent executive 48 and the remote grid computer system 200, values derived from pseudo-random number generation protocols, and the agent identity token 56. This algorithm generates secret key material of length preferably no less than 1024 bits, implementing a cryptographic keyspace of a size making it computationally infeasible to check each possible key by brute force. The effect of this combination of cryptographic techniques is implementation of a message confidentiality system in which neither cryptographic key materials nor message payloads are transmitted through or stored within non-controlled, non-secure environments as cleartext, and message delivery in the form of ciphertext that may be decrypted into meaningful and usable cleartext only by the grid computer system 200 and the individual, universally unique agent executive 48 that generated a message or for which a message was intended.

Process for Verifying the Integrity of an Agent Executive 48 Using a Grid Computer System 200.

Figure 4A:
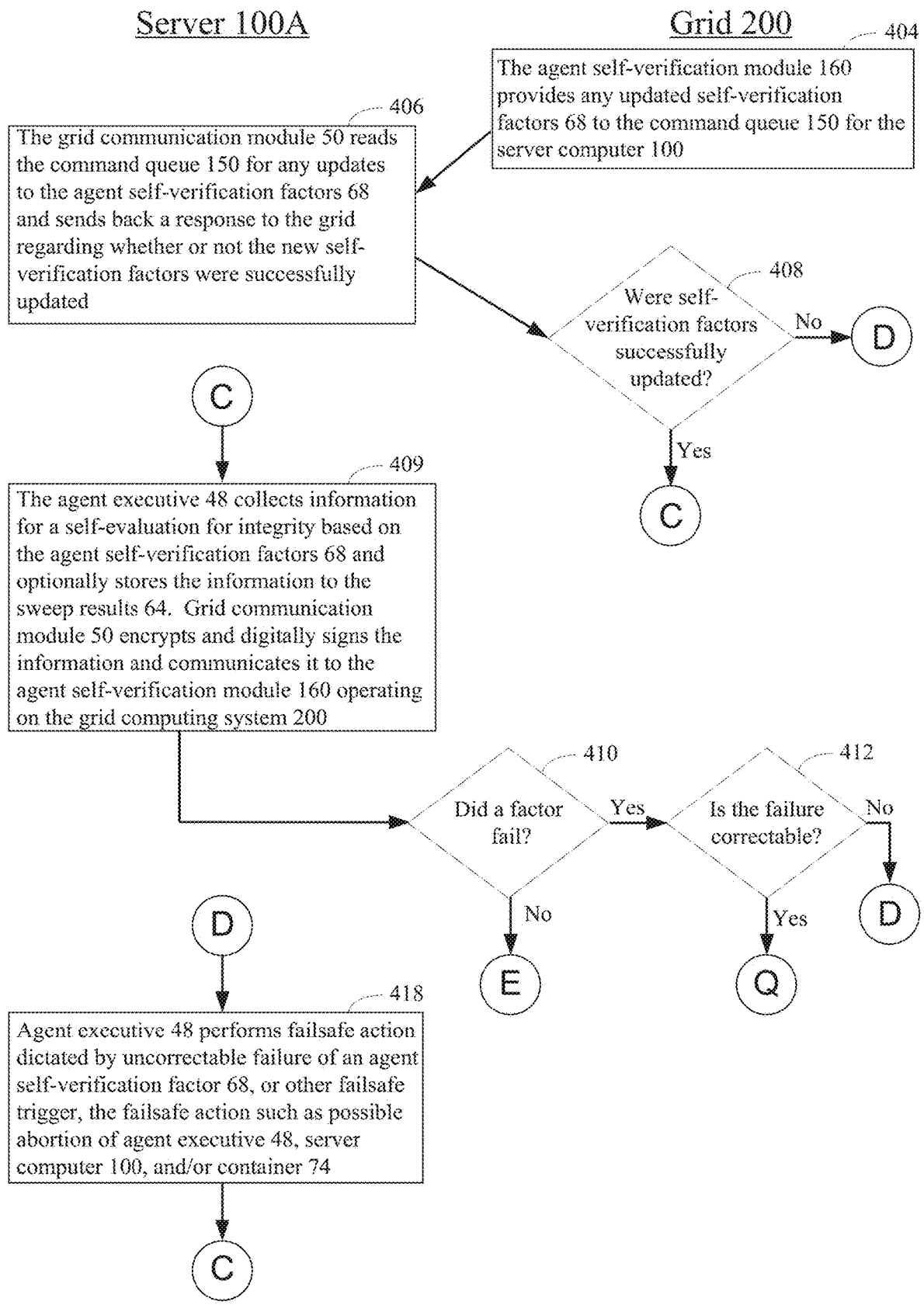
FIG. 4A illustrates a method in which the integrity of an agent executive can be verified using a grid computer system in accordance with an embodiment of the present disclosure.
Figure 4B:
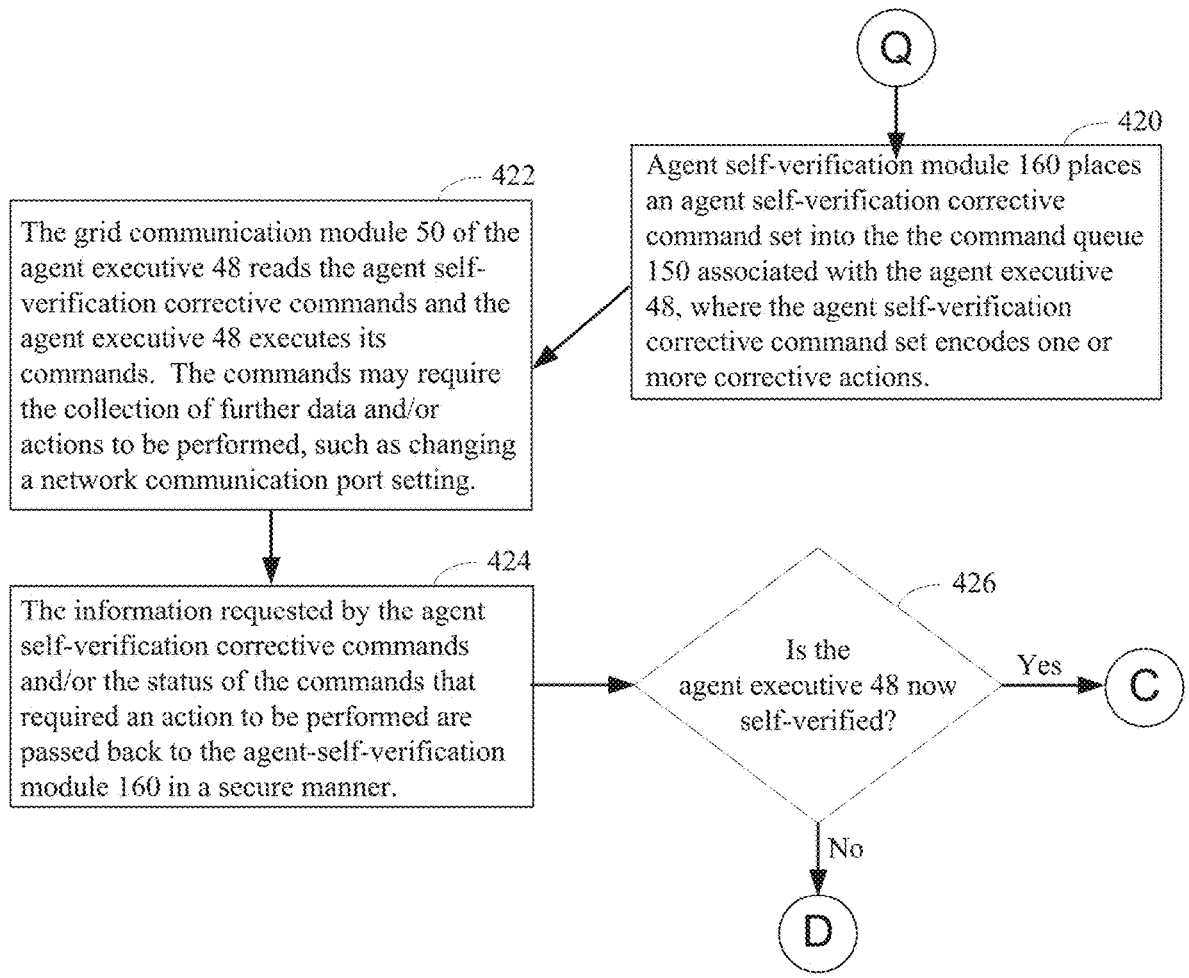
FIG. 4B illustrates a method in which the integrity of an agent executive can be verified using a grid computer system in accordance with an embodiment of the present disclosure.

FIGS. 4A-4B illustrate processes by which the integrity of an agent executive 48 can be verified using a grid computer system 200 in accordance with the present disclosure once the agent executive 48 has a valid agent identity token 56.

What is depicted in FIG. 4A are two separate processes that run independent of each other. The first process, blocks 404 through 408, serves to update self-verification factors 68 in the server computer 100 affected by a policy. Thus, FIG. 4A is executed, for each server computer 100 affected by agent self-verification factors 68, whenever a grid computer system 200 administrator changes such self-verification factors 68. Typically, such self-verification factors 68 form part of a policy that encompasses one or more server computers 100 or one or more containers 74 that are hosted on a server computer 100. In such instances, when the grid computer system 200 administrator changes self-verification factors 68 within such a policy, the process depicted by blocks 404 through 408 is run for each server computer 100 affected by the policy. In some embodiments, the first process serves to update self-verification factors 68 in the server computer 100 that hosts a container 74 affected by a policy.

Block 404.

In block 404 the agent self-verification module 160 operating on the grid computer system 200 provides any updated self-verification factors 68 to the command queue 150 for the container 74 or associated server computer 100 that hosts the container 74. The posting of such factors to the command queue 150 for the container 74 or associated server computer 100 that hosts the container 74 is advantageous because, for security purposes, the agent executive 48 cannot accept a network connection from any device or process, regardless of whether any such device or process is running within the container 74 or associated server computer 100 that hosts the container 74 including the agent self-verification module 160. Thus, in order to communicate with the agent executive 48, the agent self-verification module 160 posts the factors to the command queue 150 for retrieval by the server computer 100 and/or the container 74. Block 404 represents a process that is quite apart from, and independent of any self-verification process for any given container 74 or associated server computer 100 that hosts the container 74. Whenever the self-verification factors 68 on the grid computer system 200 are updated for any reason, commands are put on the command queues 150 for any and all agent executives 48 that are in the scope for the changes.

Block 406.

In block 406, the grid communication module 50 reads the command queue 150 for the updates to the agent self-verification factors 68. The grid communication module sends back a response to the grid computer system 200 regarding whether or not the new self-verification factors 68 were successfully updated.

Block 408.

In block 408, a determination is made as to whether the update of the self-verification factors was successful. If so (408—Yes), process control passes to block 409. If not (408—No), process control passes to block 420 in order to perform failsafe actions.

Block 409.

Block 409 begins the process of self-verification. In block 409, the agent executive 48 collects information for a self-evaluation for integrity of the agent executive 48 as dictated by the agent self-verification factors 68. While the agent executive 48 collects the information requested by the agent self-verification factors 68, the agent executive 48 does not actually use the information to determine the integrity of the agent executive 48. Typically, the agent executive 48 stores the information in the agent data store 52. Regardless of whether the information is stored in data store 52, the information is encrypted and signed by the agent executive 48, as identified by the agent identity token 56 associated with the agent executive, and communicated using a secure message security protocol such as the one described in the section above entitled "Message Security Protocol", to the agent self-verification module 160 operating on the grid computer system 200.

Block 410.

In block 410, the agent self-verification module 160, operating on the grid computer system 200, makes a determination as to whether any of the self-verification factors 68 have failed. This is done by comparing the information collected in block 408 to one or more associated self-verification rules in the set of self-verification rules 180. If a factor has failed, (410—Yes), then process control passes to block 412. Otherwise (410—No), the agent executive 48 is confirmed to be intact and process control passes to block 502 of FIG. 5.

Block 412.

In block 412, a determination is made as to whether the failure detected in block 410 is correctable. If so (412—Yes), process control passes to block 420 of FIG. 4B. If the failure detected is not correctable (412—No), either because (i) the failure was detected on a previous cycle and the agent self-verification corrective commands of FIG. 4B were not able to correct the problem during this previous cycle, or (ii) the initial pass through block 412 determined that the failure was not correctable, process control passes to block 418 in order to initiate failsafe action.

Block 418.

In block 418, the agent executive 48 performs a failsafe action dictated by uncorrectable failure of an agent self-verification factor 68 including possible abortion of agent executive 48, server computer 100, and/or container 74. In practice, although not illustrated in FIG. 4A, the manner in which failsafe action is taken in some embodiments is for agent self-verification module 160 to post agent self-verification failsafe commands to the command queue 150 associated with the agent executive 48, where the agent self-verification failsafe commands encode one or more failsafe actions. As such, agent self-verification failsafe commands include commands which will, for example, alert an administrator, shut down the agent executive 48, shut down the virtual machine 42, shut down the container 74, shut down the container manager 72, shut down the container engine 70, shut down the server computer 100, or some combination thereof. Moreover, other examples of failsafe actions including alerting the user by e-mail, setting the state of the agent to "requires attention" in the grid computer system 200, firing a forensic data collection automatically, updating firewall rules or other security configuration parameters, etc. Multiple failsafe actions can be triggered.

Block 420.

Turning to FIG. 4B, block 420 is reached if a determination is made that a self-verification factor has failed but that such failure may be correctable. In such instances, agent self-verification module 160 will place an agent self-verification corrective command set into the command queue 150 associated with the agent executive 48, where the agent self-verification corrective command set encodes one or more corrective actions. As such, agent self-verification corrective commands include commands which will, if successfully implemented, cause the agent executive 48 to become valid.

Block 422.

The grid communication module 50 of the agent executive 48 reads the agent self-verification corrective commands and the agent executive 48 executes its commands. The commands may require the collection of further data and/or actions to be performed, such as changing a network communication port setting.

Block 424.

In some instances, after the agent self-verification corrective commands are executed, the information requested by the agent self-verification corrective commands and/or the status of the commands that required an action to be performed are passed back to the agent-self-verification module 160. As in all instances where information is passed between the server computer 100 to the grid computer system 200, such information is encrypted and signed by the agent executive 48, as identified by the agent identity token 56 uniquely associated with the agent executive using, for example, the secure communication methods disclosed in the section entitled "Message Security Protocol" above.

Block 426.

If the agent-self-verification module 160 is satisfied with the information received (426—Yes), then the agent executive 48 is deemed corrected for the initial failure and process control passes on to block 409 to ensure correction. If the agent-self-verification module 160 is not satisfied with the information received (426—No), then the agent executive 48 is deemed not corrected for the initial failure and process control passes on to block 418. It will be appreciated that the process illustrated in FIG. 4B can be run in parallel for any number of correctible failures.

Checking the Security, Compliance, and Integrity of Data Structures, Processes, File Systems, or States Associated with a Container Using a Grid Computer System.

Figure 5:
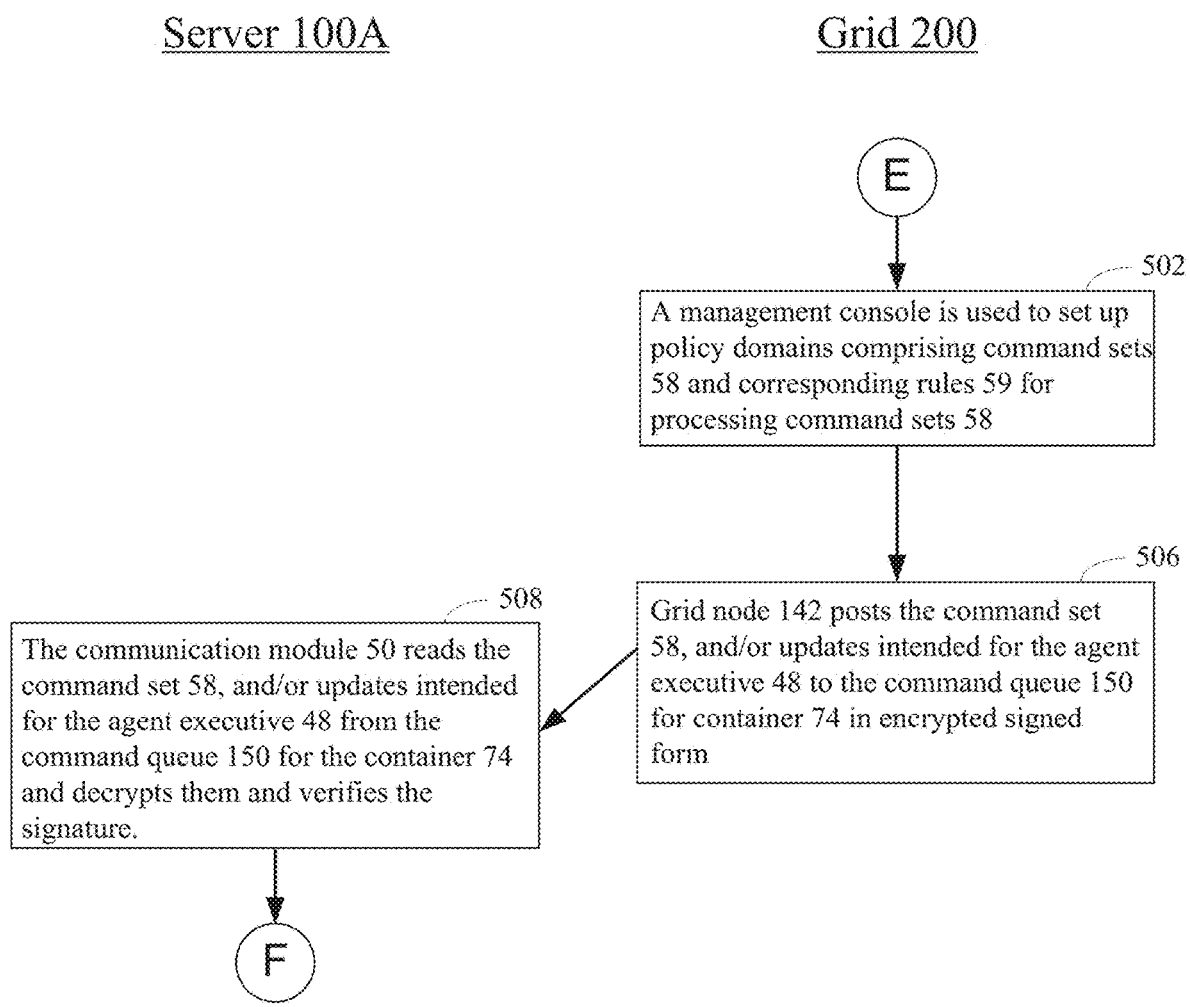
FIG. 5 illustrates a method by which custom command sets that check the integrity of various data structures, processes, file systems, or states associated with a container, as well as other optional information, can be created using a grid computer system and communicated in a secure manner to a server computer in accordance with an embodiment of the present disclosure.

FIG. 5 illustrates a method by which custom command sets 58 that check the security, compliance, and integrity of various data structures, processes, file systems, or states associated with a container 74 can be created using the grid computer system 200 and communicated in a secure manner to a server computer 100 in accordance with the present disclosure. As previously described, in some embodiments these command sets 58 check the security, compliance, and integrity of various data structures, processes, file systems, or states associated with a container image 374.

Block 502.

In block 502 command sets 58 and corresponding rule sets 59 for processing command sets 58 are set up. In some embodiments, there are two or more command sets 58 for a corresponding container 74, one for the checking the states of security, compliance and integrity of the container 74 and the other commands sets for checking the states of security, compliance, and integrity of various programs and/or data structures that are running and/or present on the container 74. In some embodiments, there is a single command set 58 for a corresponding container 74 for checking the states of security, compliance and integrity of the container 74 as well as the states of security, compliance, and integrity of various programs and/or data structures that are running and/or present on the container 74.

One or more command sets 58 and their corresponding rule sets 59 constitute a policy domain. The purpose of a policy domain is to establish a specific configuration or policy for each type of container 74, or a grouping of containers 74 of a same type, which will help harden it against and react to prevent attacks. The policy domain consists of a set of commands 58 applied to both the container 74 and the applications running on it and a corresponding set of rules 59 to ensure that the commands are appropriately executed. Other commands 58 and corresponding set of rules 59 might be associated with reactive actions designed to prevent a successful attack against container 74. Groups of containers 74, each running the applications, can run the same policy domain, greatly reducing the number of command sets 58 that the grid computer system 200 needs. In this way, any rules, commands, scheduling directives and configuration parameters, including firewall rules and configuration directives, may be scoped to affect all containers 74, a single container 74, or multiple user-defined groups of containers 74.

In some embodiments, a command set 58 comprises one or more commands 66 to implement a SVA scan. The SVA scan is utilized to detect vulnerabilities by comparing at least versions of software packages of an operating system, drives, daemons, and applications against a plurality of published vulnerability sources. These vulnerability sources include but are not limited to the National Institute of Standards and Technology (NIST) database of Common Vulnerabilities and Exposures (CVE).

In some embodiments, a command set 58 comprises one or more commands 66 to implement a CSM scan. The CSM scan is utilized to ensure that a container 74, a container image 374, a virtual machine 42, or a combination thereof have secured authorized changes therein. These authorized changes are applicable to at least changes in the configuration settings, changes in the file presence, changes in the file attributes, changes in the directory attributes, changes in the process presence, changes in the ownership of the process, changes in user identity, changes in user activity, changes in user home directory settings, changes in group characteristics, changes in network services, and changes in the processes of the network services.

In some embodiments, a command set 58 comprises one or more commands 66 to implement a SAM scan. The SAM scan is utilized to ensure that a container 74, a container image 374, a virtual machine 42, or a combination thereof have secured remote access. A secured remote access includes auditing account information and login history for the container 74, the container image 374, the virtual machine 42, or the combination thereof. Audits include but are not limited to determining a total number of accounts, determining a status of each account (e.g., active, inactive, deactivated, etc.), determining a root privilege status for each account, determining a shell access status for each account, and determining a login history comprising a login time log and a login location log.

In some embodiments, a command set 58 comprises one or more commands 66 to implement a FIM scan. The FIM scan is utilized in order to ensure that a container 74, a container image 374, a virtual machine 42, or a combination thereof have a secure directory tree and paths thereof. For instance, in some embodiments a FIM scan analyses at least a text file or a binary file and the content and metadata therein, a directory and the metadata therein, a symbolic link and the metadata therein, a device and/or special file and the metadata therein, as well as a WINDOWS registry key and the content and metadata therein. In some embodiments, a baseline container 74, a baseline container image 374, or a baseline virtual machine 42 is created and configured as a canonical guideline for correctly configured clean file structures. This baseline guideline comprises cryptographic signatures, metadata for each monitored file, and metadata for files that lack content (e.g., a director or a symbolic link).

In some embodiments, a command set 58 comprises one or more commands 66 to implement a LIDS scan. The LIDS scan is utilized to ensure that a container 74, a container image 374, a virtual machine 42, or a combination thereof have secure traffic therein. For instance, in some embodiments when a container image 374 or corresponding container 74 comprises a webpage configured according to WordPress. Typically, a log of a WordPress webpage is obtained through an administrator console. This administrator console does not require a specific configuration or plugin which creates vulnerabilities in the webpage. Accordingly, fraudsters that attempt to exploit the vulnerability may do so through the REST API, and may appear in logs with a flagged user identifier and/or a flagged IP address.

In some embodiments, a command set 58 comprises one or more commands 66 to implement a CI/CD scan. The CI/CD is utilized to ensure that a container 74, a container image 374, a virtual machine 42, or a combination thereof have secure development and operations (DevOps) environments. Ensuring a secure DevOps environment includes but is not limited to ensuring: a sandbox environment is the same as a pre-production and/or production environment, a consistent configuration hardening standards (be described infra), a compliant registry infrastructure, a compliant registry integration (e.g., compliance between registries such as Docker Private Registry (DPR), Docker Trusted Registry (DTR), Amazon Elastic Container Registry (ECR), jFrog, etc.), secure CI/CD plugins (e.g., Jenkins, Bamboo, TeamCity, CircleCI, TravisCI, etc.), secure monitoring, and a secure API.

In some embodiments, a command set 58 comprises one or more commands 66 to verify an image configuration hardening of a respective container image 374 in one or more registries 370. In some embodiments, the container image configuration hardening includes user access controls of a container 74 corresponding to the respective container image 374. The configuration hardening also includes network configurations of the container 74 corresponding to the respective container image 374. In some embodiments, the configuration hardening also includes a process profile of the container 74 corresponding to the respective container image 374. The present disclosure is not limited to these specific configuration hardening examples, as other configuration hardenings can be similarly applied to the present disclosure.

In some embodiments, a command set 58 comprises one or more commands 66 to verify a runtime configuration of a container 74. In some embodiments, the runtime configuration of a container 74 allows a client or administrator to configure, define, and store data as a hierarchy of value pairs in order to at least communicate service states, communicate notifications of changes to data, and share information between various tiers of service.

In some embodiments, a command set 58 comprises one or more commands 66 to create an inventory of container images 374. In some embodiments, this command is a first command as creating an inventory of objects allows for a more efficient scanning thereof. In some embodiments, the inventory of container images 374 is across a variety of registries 370 (e.g., across a DPR, a DTR, a ECR, etc.) In some embodiments, an inventory of registries 370 is created. In some embodiments, the inventory of container images 374 is a collection of information associated with each container image 374 in a registry 370. Collected information associated with each container image 374 includes, but is not limited to, a registry 370 name which is the name of the registry that contains the container image 374 (e.g., Azure or Alpine), an image tag that is applied by an administrator of the registry 370 (e.g., a version number such as 3.0 or 4.2), an image identifier (ID) that is a unique ID of the container image 374 (e.g., a serial number), a creation date of the container image 374 that is an approximate date-time at which the container image 374 was build, a discovered or detected date of the container image 374 that is an approximate date-time at which the container image 374 was first detected by the grid computer system 200, a use status of the container image 374 that describes if this container image 374 is the most recent version of the container image 374, and the like. Collected information associated with each registry 370 includes, but is not limited to, a name of the registry 370 (e.g., Amazon EC2 or GCP), a total number of repositories in the registry 370, a total number of images in the registry 370, a registry status (e.g., active, pending, deactivated, and error), and a date of last inventory of the registry 370. A form of the inventory of the container images 374 and/or the inventory of the registries 370 is not limited to one specific form, such as a table or web map. For instance, in some embodiments the inventory of the container images 374 or the inventory of the registries 370 is viewable to a client or administrator in a graphical user interface (GUI), is viewable in a command-line user interface (CLI), or is not viewable. In some embodiments, the one or more commands 66 to create an inventory is repeated at a predetermined time. For instance, in some embodiments the one or more commands 66 to create an inventory is repeated when a new container image 374 is created, when a container image 374 is deactivated, when a new registry 370 is created, when an update to the agent executive 48 occurs, when a clock of the grid computer system 200 is midnight, and the like. In some embodiments, the one or more commands 66 to create an inventory is repeated at a predetermined recurring basis. For instance, in some embodiments the commands 66 to create an inventory is repeated every day, every fortnight, every month, and the like.

In some embodiments, a command set 58 comprises one or more commands 66 to map one or more vulnerabilities in one or more layers of a corresponding container image 374 in one or more registries 370. As previously described, container images 374 are built upon a hierarchy of dependent layers 376. When an initial parent layer 376-P is modified, a new first layer 376-1 (or 376-W when this new layer is the top writable layer) is created to reflect the modifications to the parent layers 376-P. When a vulnerability in the parent layer 376-P exists and is not accounted for or remedied in the modification to the parent layer 376-P, the vulnerabilities is inherited by the new layer 376-1. Thus, mapping a vulnerability and propagations of the vulnerability through layers 376 is a major tool in container security. This mapping prevents so called "typhoid Mary" container images 374 form spreading and mass-reproducing.

In some embodiments, a command set 58 comprises one or more commands 66 to create a map between one or more container images 374 in one or more registries on the container registry 300 and one or more containers 74 in the container engine 70 on the server computer 100. As previously described, this map allows efficient tracking of a vulnerability though multiple layers 376, images 374, registries 370, and container registries 300.

In some embodiments, a command set 58 comprises one or more commands 66 to create groups between one or more container images 374 in one or more registries on the container registry 300 and one or more containers 74 in the container engine 70 on the server computer 100. For instance, in some embodiments a group is created for each type of container 74 or container image 374, such that containers 74 and container images 374 of a same type are compiled in a single common group. Likewise, in some embodiments a group is created for each type of vulnerability, such that containers 74 and container images 374 which include a same vulnerability are grouped in a single common group.

In the case of a multi-tenant system, many policy domains 152 would reside in grid node 142. If an operator has one or more private instances of grid module 142, there would likely be only one policy domain 152. One API key is associated with each policy domain 152. The API key initially establishes an association between an agent identity token 56 and the policy domain 152.

A management console associated with the grid computer system 200 is used to create, modify or delete policy domains 152. As such, the management console is used to create, modify or delete one or more rules (and related commands or actions); to modify the frequency with which sweeps and/or commands are executed by the agent executives 48; and to configure other parameters germane to the module in question (e.g., who should receive e-mail alerts, what kind of issue is considered "critical", etc.) Based on the scope of the creations, modifications, deletions made in the management console, the grid computer system puts the messages needed to affect the changes on the message queues of all the containers 74 that are within the scope of the policy domain that has been modified.

Each respective command 66 in a command set 58 checks an important configuration of the container 74 and/or an application running on the container 74 to which the respective rule is applicable. The results of the commands 66 are checked against corresponding rules 59. In some embodiments, each command 66 and its corresponding rule 59 are represented by a name (e.g., "cron should always be running") and a description (e.g., "the cron daemon should always be running"). In some embodiments, there is an indication as to whether the failure of the rule 59 for a command 66 should be considered a critical risk. If a rule is deemed critical, then failsafe action, up to termination of the container 74, is designated. However, the failure of a general rule 59 (e.g., a rule not directly associated with agent executive 48 self-verification) doesn't necessarily cause termination of agent executive 48 and container 74. A rule failure can trigger one or more actions that might include commands to attempt to remediate the issue, generating e-mail or other kinds of alerts, simply recording the rule failure, recording the rule failure in a build log, or going to the extreme of shutting down the agent executive 48 and the container 74 to absolutely contain the compromise. In some embodiments, a command set 58 comprises one or more commands 66 to terminate the security module. In some embodiments, termination of the security module is followed by re-initiation of the security module.

Moreover, in some embodiments, rules 59 and, indeed commands 66 and/or commands sets 58, may be designated as active or de-activated. Commands 66 for active command sets 58 are executed by agent executive 48 whereas non-active commands 66 are stored by the grid computer system 200 but are not executed by the agent executive 48. Importantly, while commands 66 are communicated to a server computer system 100, for security purposes, the rules 59 used to interpret the results of the commands sets 58 remain on the grid computer system 200 and cannot be accessed by the server computer system 100.

In some embodiments, a command set 58 comprises one or more commands 66 for checking a status of a data structure accessible to the container 74 or for checking a status of a process running on the container 74. In some embodiments, a command set 58 comprises one or more commands 66 for checking the status of a setting associated with a file stored in the agent data store 52 (memory) accessible to the container 74, a setting of a directory stored in the memory accessible to the container 74, or an existence or a status of a process running on the container 74. In some embodiments, a command set 58 comprises one or more commands 66 for checking a password associated with a user or with a group of users of the container 74. In some embodiments, a command set 58 comprises one or more commands 66 for checking a status of a network communication port that is associated with the container 74.

In some embodiments, a command set 58 comprises one or more commands 66 for validation of a name-value pair in a file in a memory accessible by the container 74. For instance, in some embodiments, a rule 59 comprises a configuration file path (e.g., "/etc/httpd/httpd.conf", an optional configuration file section, a configuration item (first component of the name-value pair, e.g., "User"), a desired value (second component of the name-value pair, e.g., "nobody"), an optional configuration file comment character (e.g., "#"), a configuration item/value delimiter, if any, and a remedial suggestion (e.g., "if this rule fails, the User setting in the Apache configuration file should be changed to 'nobody'"). Thus, in the exemplary rule, if the value for "User" in the Apache configuration file is set to other than "nobody" the rule requires that it be set to "nobody." Thus, in this example, the command 66 for the rule 59 would be to acquire the relevant name-value pair from the file /etc/httpd/httpd.conf form the server computer 100 and the rule 59, operating on the grid computer system 200, would check to see if the name-value pair retrieved by the command 66 is correct (e.g., "User nobody"). If so, the rule passes. If not, the rule fails.

In some embodiments, a command set 58 comprises one or more commands 66 for a corrective action or a proactive protection action. A corrective action is a command 66 configured to fix a security vulnerability which already existed or fix a security vulnerability that is detected or identified in a container 74. Likewise, a proactive protection action is a command 66 configured to prevent a future security issues in a container 74. In other words, a corrective action is configured to responds to an event after the event occurred, whereas a proactive protection action preemptively controls an event. For instance, in some embodiments a corrective action command 66 is configured to correct deficiency or security issues in a container 74 when the deficiency or security vulnerability is detected. In some embodiments, when a security vulnerability of a container 74 or virtual machine 42 is known publically, a command 66 proactively protects the container 74 by fixing the known security defect before the container 74 is compromised.

In some embodiments, a command set 58 comprises one or more commands 66 to request to repeat the processes for verifying the integrity of an agent executive 48 using a grid computer system 200 (e.g., block 409 of FIG. 4A). Such processes include the collecting information on the server computer 100 for an evaluation of integrity of the agent executive, the encrypting the information to create encrypted information, the signing of the encrypted information, and the communicating of the signed encrypted information. In some embodiments, the request to repeat the processes occurs at a predetermined time. For instance, in some embodiments the request to repeat the processes occurs when a new container 74 is detected. In some embodiments, the request to repeat the processes occurs at a predetermined time interval. For instance, in some embodiments the request to repeat the processes occurs every day, occurs every week, occurs every month, or occurs each time a client changes a parameter of a container image 374.

In some embodiments, a command set 58 comprises one or more commands 66 to update the agent self-verification module 160 and/or the agent self-verification factors 68. After the agent self-verification module 160 and/or the agent self-verification factors 68 is updated, a request to repeat the processes by which the integrity of an agent executive 48 is verified using a grid computer system 200 (e.g., block 409 of FIG. 4A) is received. The repeated processes use the updated agent self-verification factors 48. In some embodiments, the request to repeat the processes is received at a predetermined time interval. For instance, in some embodiments the request to repeat the processes occurs every day, occurs every week, occurs every fortnight, occurs at midnight each day, and the like. In some embodiments, the request to repeat the processes is received at a predetermined time. For instance, in some embodiments the request to repeat the processes is received on the first of each month, is received when an update to a container 74 is pushed, is received when a client changes a setting of a container image 374, and the like.

In some embodiments, a command set 58 comprises one or more commands 66 to scan one or more layers 376 of a container image 374. The scanning in configured to detect a vulnerability in layer 376 of the container image 374, or in the container image 374 itself. In some embodiments, the one or more commands 66 scans each layer 376 of each container image 374 of each registry 370 for vulnerabilities in the container image 374. In some embodiments, the layer 376 to be scanned by the one or more commands 66 is the writeable layer 376-W.

In some embodiments, a command set 58 comprises one or more commands 66 to scan a respective container image 374 of a registry 370. In some embodiments, the scanning of a respective container image 374 includes extracting the respective container image 374 from the container registry 300 and instancing the container image 374 as a container 74 on the server computer 100. Scanning of a container image 374 includes identifying, at least, vulnerable packages in the container image 374, container image 374 configuration hardening, container image 374 trust and verification, as well as embedded secrets in the image such as hidden layers 376.

In some embodiments, a command set 58 comprises one or more commands 66 to scan a respective container image 374 that has not been previously scanned in order to identify one or more vulnerabilities in the respective container image 374. For instance, in some embodiments when a container image 374 does not include a last scanned date, the container image 374 is then scanned. In some embodiments, when a recently created container image 374 is uploaded to registry 370, this container is identified by the agent executive 48. A container 74 of the container image 374 is then deployed and stored in the memory 14 of the server computer 100-A. Once deployed and stored, the container 74 is scanned for a variety of vulnerabilities.

In some embodiments, a command set 58 comprises one or more commands 66 to detect and/or identify a secret embedded in a container image 374 in the one or more registries 370. As used herein, a "secret" is a malicious portion of a container 74 or container image 374 that a client does not know about. Embedded secrets include, but are not limited to, API keys, configuration files, configuration management services, database credentials, hidden layers, or environment specific data.

In some embodiments, a command set 58 comprises one or more commands 66 to verify a daemon configuration in a container image 374 in one or more registries 370. Daemon configurations include, but are not limited to, configuring container default gateway addresses, configuring print usage, set cluster store options, or configuring running an application in a container 74 to forward signals and reap processes. More information and features of daemon configurations are found at Docker Docs on the Internet at docs.docker.com/engine/reference/commandline/dockerd, accessed March 2018.

In some embodiments, a command set 58 comprises one or more commands 66 to audit a lifecycle of a container image 374. In some embodiments, a lifecycle of a container image 374 includes a build of the container image such as an operating system and web application installed with the operating system. In some embodiments, a lifecycle of a container image 374 includes a distribution of the container image 374 which is a deployment distribution strategy and pathway. Deploying distribution strategies include, but are not limited to, emptiest node, high availability, or every node. In some embodiments, a lifecycle of a container image 374 includes a run of the container image 374. The run of a container image 374, or container 74, is a process that isolates the file system, its own networking, and its own isolated process tree separate from the server computer 100.

In some embodiments, a command set 58 comprises one or more commands 66 to verify one or more activities on, at, or in a container image 374. The one or more commands 66 of this command set 58 also verifies one or more changes in the container image 374. Activities and changes of the container image 374 include, but are not limited to, password changes, active users for a web application installed in the container image 374, network configuration changes, applications installed on a container image 374, container image 374 cloning, and the like. Activates and changes of the present disclosure also includes orchestration activities and changes.

In some embodiments, a command set 58 comprises one or more commands 66 to run a benchmark audit on a container image 374 in one or more registries 374. In some embodiments, the benchmark audit is a Center for Internet Security (CIS) benchmark audit. See, the Internet at cisecurity.org/cis-benchmarks/, accessed March 2018, for further information regarding the CIS benchmark audit.

In some embodiments, a command set 58 comprises one or more commands 66 to compile a build log. Typically, the build log is created, or parsed, after each command 66 is completed. However, the present disclosure is not limited thereto as, in some embodiments, the build log is created, or passed, after each command set 58 is completed. In some embodiments, the build long includes at least a list of: detected container 74 or image 374 vulnerabilities; a critical status of each vulnerability, container 74, or image 374; a type of each vulnerability, container 74, or image 374; an issue name of each vulnerability; a remotely exploitable status of each vulnerability; a maximum common vulnerability scoring system (CVSS) of each vulnerability (e.g., a score of 0 to 10); a common vulnerabilities and exposures (CVE) count; a common weakness enumeration (CWE) class; an issue age; an issue last updated data; and the like. In some embodiments, the build log is, or includes, a configuration assessment report. The configuration assessment report produces an assessment of various container 74, image 374, and application configurations that are of interest to a client. For instance, in some embodiments the configuration assessment report includes an assessment and/or report of a daemon configuration, a container runtime configuration, a container image 374 configuration, and/or an orchestration configuration (e.g., Kubernetes container-orchestration, Docker swarm, Mesos, Amazon Web Services ECS, etc.)

In some embodiments, a command set 58 is an image assurance command set. The image assurance command set 58 in configured to include a plurality of commands 60 that relate to an image level of security. For instance, in some embodiments the image assurance command set 58 includes commands 60 that are related to detecting vulnerable packages in images 374, configuration hardening of images 374, trust and verification configurations of images 374, and embedded secrets in images 374.

In some embodiments, a command set 58 is a configuration assessment command set. The configuration assessment command set is configured to include a plurality of commands 60 that are associated with the security of systems settings and configurations. For instance, in some embodiments the configuration assessment command set 58 includes commands 60 that are related to daemon configurations, container 74 runtime configurations, image 374 configurations, and or container-orchestration configurations (e.g., Kubernetes container-orchestration configurations).

In some embodiments, a command set 58 is an audit and compliance command set. The audit and compliance command set is configured to provide security insurance by parsing activities and changes of a container registry 300 and/or server computer 100. For instance, in some embodiments the audit and compliance command set 58 includes commands 60 that are related to a build, distribute, and run of an image 374, activity and changes of a container 74, activities and changes of a container-orchestration, providing software vulnerabilities reports, and a report from the configuration assessment command set.

In some embodiments, a command set 58 is a development and operations ecosystem command set. The development and o Block 506.

In block 506 the grid node 142 posts the command set 58 and/or updates intended for the agent executive 48 and/or the security module to the command queue 150 for container 74 in encrypted form. In typical embodiments, this information is encrypted and signed prior to sending it to the server computer 100, for example, in the manner set forth in the section entitled "Message Security Protocol" above. In some embodiments, this update is a firewall policy update. In some embodiments, the firewall policy update is a firewall policy update of the security module. In some embodiments, the firewall policy update is a firewall policy update of the agent executive. In some embodiments, the firewall policy update is a firewall policy update of the agent executive and the security module.

Block 508.

In block 508 the communication module 50 reads the command set 58 and other updates from the command queue 150 for the container 74 and decrypts them, for example, in the manner set forth in the section entitled "Message Security Protocol", above. Process control then passes on to block 602 of FIG. 6A. In some embodiments, the querying and execution of the command queue 150 is repeated at a predetermined time. For instance, in some embodiments the querying and execution of the command queue 150 occurs at midnight each day, occurs on the first of each month, occurs when an update to a container 74 is pushed, and the like. In some embodiments, the querying and execution of the command queue 150 is repeated on a recurring basis. For instance, in some embodiments the querying and execution of the command queue 150 occurs every day, occurs every week, occurs every month, and the like.

Execution of Sweeps on the Server Computer 100 and the Analysis of Information Retrieved from Such Sweeps Using Rules Stored on the Grid Computer System 200.

Figure 6A:
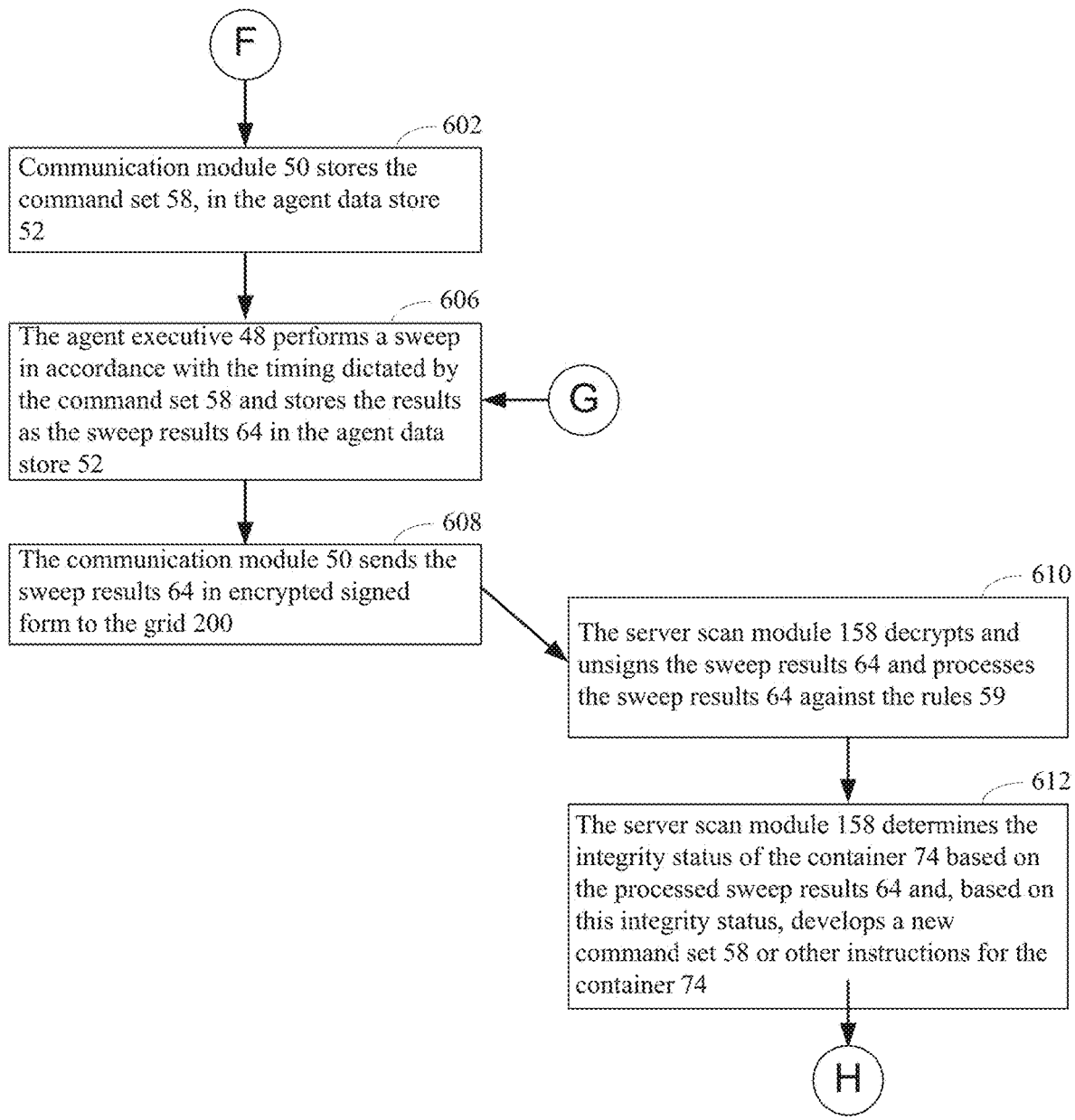
FIG. 6A illustrates how sweeps are executed on a server computer and the information from the sweeps is communicated to a grid computer system for evaluation against rules and, based on this evaluation, new commands are provided to the server computer by the grid computer system in accordance with an embodiment of the present disclosure.
Figure 6B:
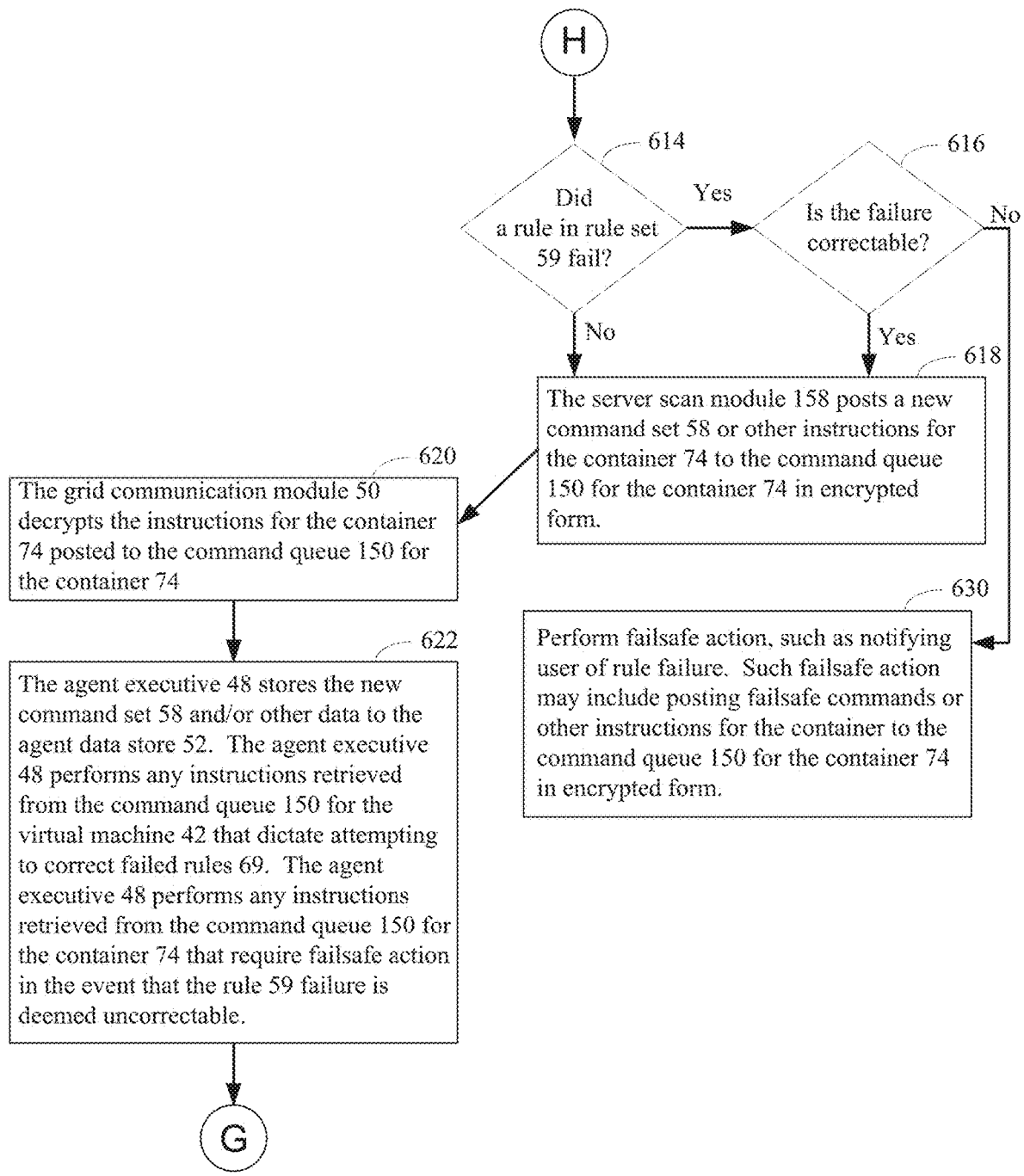
FIG. 6B illustrates how sweeps are executed on a server computer and the information from the sweeps is communicated to a grid computer system for evaluation against rules and, based on this evaluation, new commands are provided to the server computer by the grid computer system in accordance with an embodiment of the present disclosure.

FIG. 6B illustrates an exemplary process for executing a sweep on the server computer 100 and sending the information from the sweep to the grid computer system 200 for evaluation against the rules 59. Based on this evaluation, new commands 66 are provided to the server computer 100 by the grid computer system 200.

Block 602.

In block 602 the communication module 50 stores the command set 58 and/or the updated agent self-verification factors 68 in the agent data store 52.

Block 606.

In block 606, the agent executive 48 performs a sweep in accordance with the timing dictated by the command set 58 and/or the agent self-verification factors 68 and stores the results as the sweep results 64 in the agent data store 52. In some embodiments, block 606 only executes the commands 66 of one or more command sets 58 and does not collect information mandated by the agent self-verification factors 68. In some embodiments, the commands 66 of one or more command sets 58 are executed and the information mandated by the agent self-verification factors 68 is collected. Examples of commands 66 that may be executed in block 606 are described in block 502 and further examples are provided below.

In some embodiments, a command 66 requests that a certain action be taken. In one example, the command 66 may request that a file in a particular directory be deleted. Such a command is an action command. If an action command is executed in block 606, then the status of the command is captured. For instance, in the case where the action command 66 was to delete a file, the command 66 may achieve a status of "1" if the command 66 successfully deleted the file and "0" otherwise. Non-binary status results for action commands 66 are also possible and are within the scope of the present disclosure. Additional non-limiting examples of action commands that may be executed in block 606 include starting or stopping a process in container 74, deleting, moving or renaming a file, combination of files or directory, altering the privileges of a user of container 74, changing the time interval for when sweeps in accordance with block 606 are performed, purging a cache, changing the priority of a process running on the container 74, deleting or adding a user account, reinitializing the container 74, activating or deactivating a firewall or policy or a rule within a firewall policy, and making changes to configuration parameters within the container 74 and application configuration files.

In some embodiments, a command 66 requests that certain information be retrieved from the container 74. In one example, the command 66 may request that the size of a file in a particular directory be obtained. Such a command is a collection command. If a collection command is executed in block 606, then the information requested by the command is captured. More collection commands are described in greater detail in block 502 above.

Block 608.

In block 608, the communication module 50 sends the sweep results 64 in encrypted form, and signed by the agent executive 48, as identified by the agent identity token 56, to the grid computer system 200 using, for example, the techniques disclosed in the section entitled "Message Security Protocol" above to ensure secure communication of the sweep results 64. In some embodiments, sweep results 64 includes the identity and status of any action command that was executed in block 606 and the data collected by any command that requested information in block 606. In some embodiments, where block 606 also required that information dictated by agent self-verification factors 68 be collected, the sweep results further include the information dictated by the agent self-verification factors 68. It will be appreciated that there is benefit to requiring the agent executive 48 verification from time to time to ensure that the agent executive 48 has not become corrupt. Thus, in some instances of block 606, the information requested by the agent self-verification factors 68 will be collected and this information will be included in the sweep results 64 that are sent to the grid computer system 200 in block 608.

Block 610.

In block 610, the server scan module 158 decrypts and un-signs the sweep results 64 using, for example, the techniques disclosed in the section entitled "Message Security Protocol" above to ensure secure communication of the sweep results 64. The server scan module 158 then processes the sweep results 64 against the rules 59. In one example, a command executed in block 66 required that a cryptographic hash of a particular file resident in the corresponding container 74 be taken. In such an instance, the rule 59 will compare the cryptographic hash value returned by the rule 59 to a predetermined value and, if the cryptographic hash value returned by the rule 59 does not match the predetermined value, the rule 59 will fail. Advantageously, for security reasons, the exact nature of the rules, such as the predetermined value, are stored on the secure grid computer system 200 rather than being obtained by the relatively untrustworthy or uncontrolled container 74.

Block 612.

In block 612, the server scan module 158 determines the states of security, compliance and integrity of the container 74 based on the processed sweep results 64 and, based on this integrity status, develops a new command set 58 or other instructions for the container 74. Blocks 602 through 612 shows the power of the present disclosure. Information can be queried or action can be taken by the integrity-verified agent executive 48 using thoroughly authenticated and verifiable commands 66 acting on a relatively unsecure container 74 and the results of such commands can be analyzed using rules 59 that are in the secure grid computer system 200. In this way, in combination with other aspects of the disclosure, the states of security, compliance and integrity of container 74 and the programs running on the container is continuously assessed, analyzed and improved.

Block 614. In block 614, a determination is made as to whether a rule in rule set 59 failed. If a determination is made that a rule 59 has failed (614—Yes), then process control passes to block 616. If no rule 59 has failed (614—No), then process control passes directly to block 618.

Block 616.

In block 616, a determination is made as to whether the failure identified in block 614 is correctable. If a rule in rule set 59 failed and the failure is correctable (616—Yes), then process control passes to block 618 where corrective actions are posted to the command queue 150 for the container 74 or containers 74 for which the rule failed. If the rule failure is deemed not correctable (616—No), then process control passes to block 630 where failsafe action is taken. In some instance, a rule failure is deemed not correctable after corrective actions were attempted by blocks 618 and 620 and such corrective action failed to remove the rule failure.

Block 618.

In block 618, the server scan module 158 posts a new command set 58 or other instructions for the container 74 to the command queue 150 for the container 74 in encrypted and signed form. If a rule in rule set 59 failed and the failure is deemed correctable, instructions to attempt correction are posted to the command queue 150 for the container 74 in encrypted and signed form as well.

If a rule in rule set 59 failed and the failure is deemed correctable then, in practice, the manner in which corrective action is taken in some embodiments is for the server scan module 158 to post a pre-configured or dynamically generated remedial command set 58 to the command queue 150 associated with the agent executive 48, where the remedial command set 58 encodes one or more corrective actions directed to correcting some aspect of the container 74. Non-limiting examples of what may be corrected include, but are not limited to, changing a firewall setting, altering a status of a data structure accessible to the container 74, altering a process running on the container 74, changing a setting associated with a file stored in a memory accessible to the container 74, changing a setting of a directory stored in a memory accessible to the container 74, changing a password associated with a user or with a group of users of the container 74, resetting or altering a name-value pair in a file in a memory accessible by the container 74, or changing a network communication port setting that is associated with the container 74.

Block 620.

Once commands, for example commands designed to correct a self-verification factor 68 failure or rule 59 failure have been posted to the command queue 150 associated with the agent executive 48, the grid communication module 50 of the agent executive 48 reads the command set 58 and decrypts them and verifies the signature. In typical embodiments, the techniques disclosed in the section entitled "Message Security Protocol" above are used to communicate this information to the agent executive 48.

Block 622.

In block 622, the agent executive 48 stores the new command set 58 and/or other data to the agent data store 52. The agent executive 48 performs any instructions retrieved from the command queue 150 for the container 74 that dictate attempting to correct failed rules in rule set 59. Once block 622 is completed, process control passes back to block 606 and another iteration of the loop beginning at this block is performed in accordance with the periodic interval or schedule dictated by a command set 58 or by the agent executive 48 itself.

Block 630.

Block 630 is reached if a failsafe action needs to be taken because one or more rules in rule set 59 have failed. Such failsafe action may include one or more actions. Such one or more actions may include notifying the user of the failure and/or the posting of failsafe instructions to the command queues 150 for the containers 74 on which the rule in the rule set 59 failed. If such instructions are posted on queues 150 of affected containers 74, in subsequent steps not illustrated in FIG. 6B, such failsafe instructions are read by the containers 74 and executed by the agent executives 48 of the affected containers 74. Depending on the nature of the failsafe action, process control may (i) pass back to block 606 and another iteration of the loop beginning at this block is performed in accordance with the periodic interval or schedule dictated by a command set 58 or by the agent executive 48 itself or (ii) termination of the affected containers 74 initiated.

Figure 7:
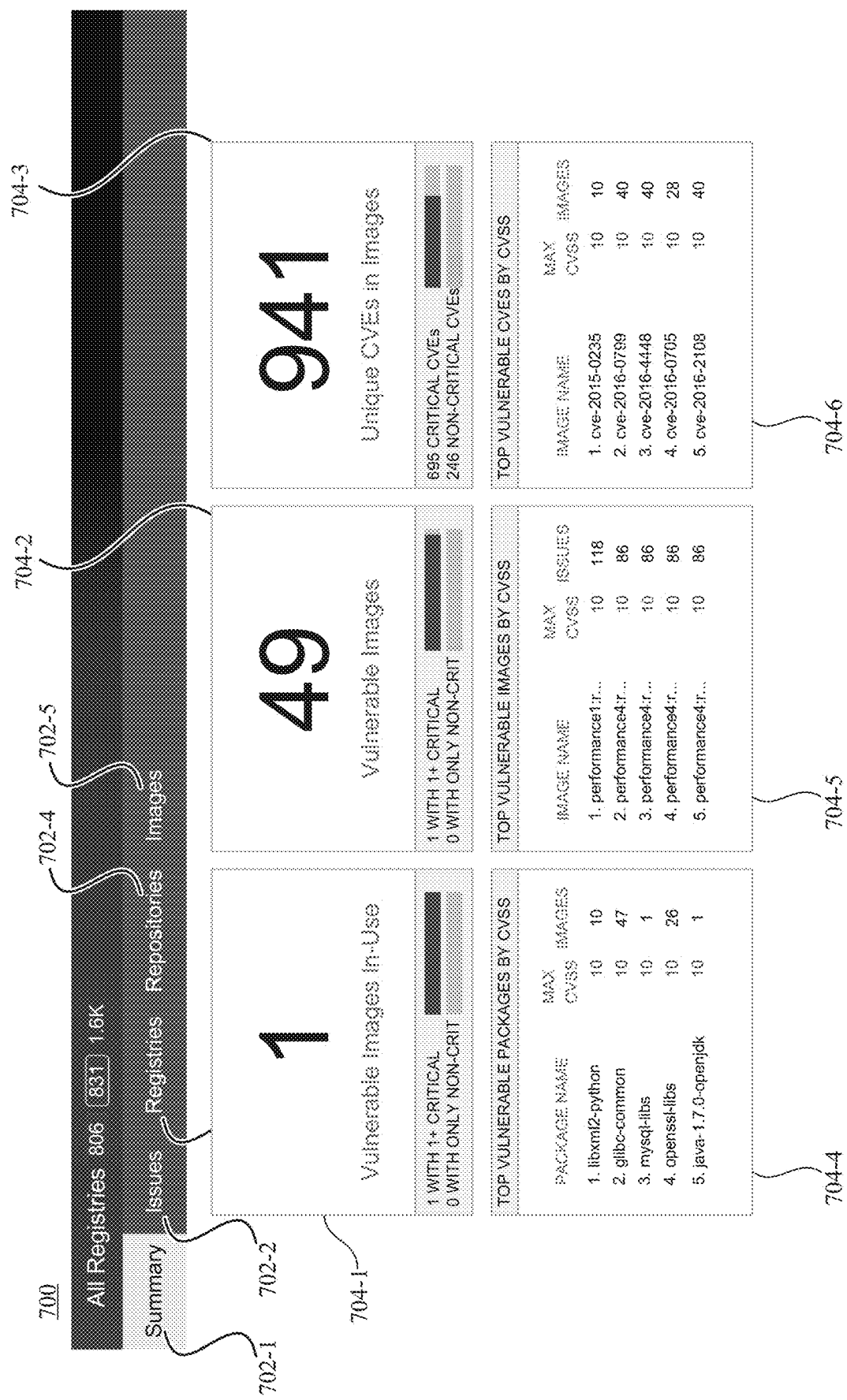
FIG. 7 illustrates a user interface for managing security of a cloud computing environment in accordance with an embodiment of the present disclosure.

Referring to FIG. 7, a user interface 700 for providing an evaluation of security in a cloud computing environment is depicted in accordance with an embodiment of the present disclosure. The user interface 700 includes tabs 702 that are used to alternate pages of the user interface 700. In some embodiments, tabs 702 include a summary tab 702-1 that provides a summary of a recent scan (e.g., a summary of an image assurance scan) and/or a summary of the total assets of an administrator. As depicted in FIG. 7, summary tab 702-1 includes a variety of panels 704 that provide an administrator with information related to security in a cloud computing context. In the present embodiment, panels 704 include a first panel 704-1 that provides a summary of vulnerable images 374 currently in use, a second panel 704-2 that provides a summary of all vulnerable images 374, a third panel 704-3 that provides a map of a count of unique CVEs identified in images 374, a fourth panel 704-4 that provides a map of vulnerable packages as determined by a maximum CVSS score and the images the vulnerable package affects, a fifth panel 704-5 that provides a map of vulnerable images 374 as determined by a maximum CVSS score and a number of vulnerabilities in each image 374, and a sixth panel 704-6 that provides a map of top CVES vulnerabilities as determined by a maximum CVSS score and a number of affected images. However, the present disclosure is not limited thereto, as a number of panels 704 and the information included therein can be customized. An issues tab 702-2 provides information of various vulnerabilities detected by the systems and methods of the present disclosure. This information includes but is not limited to a criticality of each vulnerability (e.g., critical, semi-critical, non-critical, etc.), a type of each vulnerability (e.g., a SVA vulnerability, a CI/CD vulnerability, etc.), a name of each object affected by each vulnerability (e.g., a first package is affected by a first vulnerability, a second image is affected by the first vulnerability, etc.), as well as a count of each occurrence of each vulnerability. In some embodiments, tabs 702 include a registry tab 702-3 for maintaining a variety of container registries 300. Information included in the registry tab 702-3 includes but is not limited to a name of each container registry (e.g., ECR registry 300-1, DPR registry 300-2, etc.), a total number of repositories for each container registry 300, a total number of images for each container registry 300, and registry status (e.g., active, down, deactivated, etc.), and a date of a last inventory of each container registry 300. In some embodiments, tabs 702 include a repositories tab 702-4 which is configured to maintain a variety of repositories for each container registry 300. Furthermore, tabs 702 includes an images tab 702-5 that maintains images 374 or groups of images 374 for an administrator.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a tangible computer readable storage medium. For instance, the computer program product could contain the program modules shown in FIGS. 1A and/or 1B. These program modules can be stored on a CD-ROM, DVD, magnetic disk storage product, or any other tangible computer readable data or program storage product.

Many modifications and variations of this invention can be made without departing from its spirit and scope, as will be apparent to those skilled in the art. The specific embodiments described herein are offered by way of example only. For instance, by way of non-limiting example, the agent identity token generator 144, agent communication module 148, server scan module 158, and agent self-verification module 160 may all simply be components of a single program, may be components of several different programs, or may each comprise multiple standalone programs. Any combination of these possibilities is possible provided that the functionality described above for these components and modules is achieved. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A security system comprising a first server computer system, the first server computer system comprising:
   one or more first processing units; and
   a first memory, coupled to at least one of the one or more first processing units, the first memory storing a security module and an agent executive, the agent executive runs concurrently with the security module, and the agent executive executed by one or more of the one or more first processing units, the agent executive comprising instructions for:
   (A) obtaining an agent API key from a user or by an automated process when the agent executive is executed for a first time;
   (B) communicating the API key to a remote grid computer system;
   (C) receiving an agent identity token from the remote grid computer system, wherein the remote grid computer system generates the agent identity token through a cryptographic token generation protocol when the API key is deemed valid by the remote grid computer system;
   (D) storing the agent identity token in a secure data store associated with the agent executive;
   (E) collecting information on the first server computer system for an evaluation of integrity of the agent executive using a plurality of agent self-verification factors;
   (F) encrypting the information collected by the collecting (E) thereby creating encrypted information;
   (G) signing the encrypted information using the agent identity token thereby creating signed encrypted information; and
   (H) communicating the signed encrypted information to the remote grid computer system, wherein no network connection between the remote grid computer system and the agent executive is established,
   wherein the security module maintains a plurality of containers and comprises a container engine that instances a container image as a container in the plurality of containers, and wherein the container engine comprises a container manager that manages the plurality of containers.

2. The security system of claim 1, wherein the agent executive further comprises instructions for:
   (I) querying a command queue on the remote grid computer system for one or more commands, wherein the command queue is accessed based upon an identity of the agent identity token; and
   (J) executing the one or more commands.

3. The security system of claim 2, wherein a command in the one or more commands updates a firewall policy for the agent executive or the security module.

4. The security system of claim 2, wherein a command in the one or more commands requires termination of the security module.

5. The security system of claim 2, wherein the first memory further comprises a virtual machine and the security module and the agent executive are executed and associated with the virtual machine.

6. The security system of claim 2, wherein a build log is compiled after each command in the one or more commands is completed.

7. The security system of claim 2, wherein the querying (I) and executing (J) are repeated at a predetermined time.

8. The security system of claim 2, wherein the querying (I) and executing (J) are repeated at on a predetermined recurring basis.

9. The security system of claim 1, wherein:
   the security system further comprises a second server computer system in electrical communication with the first security system, and
   the second server computer system comprises:
   one or more second processing units,
   a second memory, coupled to at least one of the one or more second processing units, the second memory storing one or more registries, wherein
   each registry in the one or more registries comprises one or more container images,
   each container image in the one or more container images of each registry in the one or more registries comprises one or more layers, and
   a layer in the one or more layers of each respective container image in the one or more container images of each respective registry in the one or more registries is writeable.

10. The security system of claim 9, wherein the agent executive further comprises instructions for:
    (I) querying a command queue on the remote grid computer system for one or more commands, wherein the command queue is accessed based upon an identity of the agent identity token; and
    (J) executing the one or more commands.

11. The security system of claim 10, wherein a first command in the one or more commands creates an inventory of container images across the one or more registries.

12. The security system of claim 11, wherein the first command is repeated at a predetermined time.

13. The security system of claim 11, wherein the first command is repeated on a predetermined recurring basis.

14. The security system of claim 10, wherein a command in the one or more commands scans a layer in the one or more layers of each respective container image for a vulnerability in the respective container image.

15. The security system of claim 14, wherein a layer in the one or more layers of each respective container image is the writeable layer.

16. The security system of claim 10, wherein a command in the one or more commands scans a respective container image in the one or more container images for a vulnerability in the respective container image.

17. The security system of claim 16, wherein the scanning comprises extracting and instancing the respective container image from the second server system as a container on the first server computer system.

18. The security system of claim 16, wherein a command in the one or more commands scans a respective container image in the one or more container images that has not been previously scanned to identify a vulnerability in the respective container image.

19. The security system of claim 18, wherein, when a new container image that has not been previously scanned is identified on the second server computer system by the agent executive, a first container of the new container image is deployed and stored in the memory of the first server computer system to test for vulnerabilities in the new container image.

20. The security system of claim 10, wherein a command in the one or more commands maps a vulnerability in the one or more layers of a corresponding container image in the one or more registries.

21. The security system of claim 10, wherein a command in the one or more commands detects a secret embedded in a container image in the one or more registries.

22. The security system of claim 10, wherein a command in the one or more commands verifies a container image configuration hardening of a respective container image in the one or more registries.

23. The security system of claim 22, wherein the container image configuration hardening comprises a user access control of the container corresponding to the respective container image, a network configuration of the container corresponding to the respective container image, a process profile of the container corresponding to the respective container image, or a combination thereof.

24. The security system of claim 10, wherein a command in the one or more commands verifies a container runtime configuration of a container image in the one or more registries.

25. The security system of claim 10, wherein a command in the one or more commands verifies a daemon configuration in a container image in the one or more registries.

26. The security system of claim 10, wherein a command in the one or more commands audits a lifecycle of a respective container image in the one or more container images, wherein the lifecycle comprises a build, a distribution, and a run of the respective container image.

27. The security system of claim 10, wherein a command in the one or more commands verifies one or more activities or one or more changes to a container image in the one or more registries.

28. The security system of claim 10, wherein a command in the one or more commands creates a map between (i) the one or more container images in the one or more registries on the second server system and (ii) the at least one container in the container engine on the first server computer system.

29. The security system of claim 10, wherein a command in the one or more commands creates groups between (i) the one or more container images in the one or more registries on the second server system and (ii) the at least one container in the container engine on the first computer system.

30. The security system of claim 10, wherein a command in the one or more commands runs a Center for Internet Security (CIS) benchmark audit on a respective container image in the one or more registries.

31. A grid computer system comprising:
one or more processing units;
a memory, coupled to at least one of the one or more processing units, the memory storing a grid node, the grid node executed by at least one of the one or more processing units, the grid node comprising instructions for:
(A) receiving an API key from an agent executive running concurrently with a security module that maintains a plurality of containers, which, in turn, is running on a computer that is remote to the grid computer system;
(B) determining whether the API key is a valid API key;
(C) generating a unique agent identity token through a cryptographic token generation protocol when the instructions for determining (B) deem the API key to be valid;
(D) communicating the agent identity token to the security module running on the remote computer;
(E) receiving encrypted information, signed with a cryptographic digital signature, from the security module from an evaluation of the integrity of the agent executive based upon a plurality of agent self-verification factors, wherein the receiving comprises decrypting the information using the agent identity token to form decrypted information and verifying the signature thereby obtaining decrypted, authenticated and integrity-verified information; and
(F) verifying the integrity of the agent executive based on the decrypted, authenticated and integrity-verified information.

32. A grid computer system comprising:
one or more processing units;
a memory, coupled to at least one of the one or more processing units, the memory storing a grid node, the grid node executed by at least one of the one or more processing units, the grid node comprising instructions for:
(A) receiving an alert from a first agent executive running concurrently with a first security module that maintains a plurality of containers on a computer that is remote to the grid computer system, the alert (i) indicating that the first agent executive has started running concurrently with the first security module and (ii) indicating a first agent identity token associated with the first agent executive;
(B) determining whether the first agent identity token is valid;
(C) determining whether the first agent identity token is being used by a second agent executive running concurrently with a second security module;
(D) generating a second agent identity token through a cryptographic token generation protocol when (i) the first agent identity token is deemed valid by the determining (B) and (ii) the determining (C) determines that the first agent identity token is being used by the second agent running concurrent with the second security module;

(E) communicating the second agent identity token to the first security module;
(F) receiving encrypted information signed by a digital signature from the first security module from an evaluation of integrity of the first agent executive based upon a plurality of agent self-verification factors, wherein the receiving comprises decrypting the information using the second agent identity token in order to form decrypted information and validating the signature; and
(G) verifying the integrity of the first agent executive based on the decrypted information when the signature has been validated.

33. The grid computer system of claim 32, the grid node further comprising instructions for:
(H) creating, as a function of the second agent identity token, a command queue on the grid computer system, wherein the command queue is unique to the first agent executive; and
(I) posting one or more commands to be executed by the first agent executive to the command queue.

* * * * *